United States Patent
Fakoorian et al.

(10) Patent No.: US 11,856,463 B2
(45) Date of Patent: Dec. 26, 2023

(54) RESOURCE RESERVATION FOR MULTIPLE SIDELINKS

(71) Applicant: QUALCOMM INCORPORATED, San Diego, CA (US)

(72) Inventors: Seyed Ali Akbar Fakoorian, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/111,222

(22) Filed: Dec. 3, 2020

(65) Prior Publication Data

US 2021/0176669 A1   Jun. 10, 2021

Related U.S. Application Data

(60) Provisional application No. 62/945,037, filed on Dec. 6, 2019.

(51) Int. Cl.
| | |
|---|---|
| *H04W 28/26* | (2009.01) |
| *H04L 5/00* | (2006.01) |
| *H04W 28/02* | (2009.01) |
| *H04W 72/02* | (2009.01) |
| *H04W 72/1263* | (2023.01) |
| *H04W 72/20* | (2023.01) |

(Continued)

(52) U.S. Cl.
CPC ........... *H04W 28/26* (2013.01); *H04L 5/0055* (2013.01); *H04W 28/0278* (2013.01);
(Continued)

(58) Field of Classification Search
CPC . H04W 28/26; H04W 28/0278; H04W 72/02; H04W 72/0406; H04W 72/1263; H04W 72/20; H04L 5/0055

(Continued)

(56) References Cited

U.S. PATENT DOCUMENTS

2019/0239264 A1*  8/2019  Hahn ..................... H04W 76/14
2020/0236655 A1*  7/2020  Bharadwaj ........... H04B 17/318
(Continued)

FOREIGN PATENT DOCUMENTS

WO   WO-2016163972 A1 * 10/2016 ........ H04W 72/1278

OTHER PUBLICATIONS

Interdigital., et al., "NR Sidelink Resource Allocation Mechanism for Mode 2", 3GPP Draft, 3GPP TSG RAN WG1 #97, R1-1907094 NR Sidelink Resource Allocation Mechanism for Mode 2_FINAL, 3rd Generation Partnership Project (3GPP), Mobile Competence Centre, 650, Route Des Lucioles, F-06921 Sophia-Antipo vol. RAN WG1, No. Reno, USA, May 13, 2019-May 17, 2019, May 13, 2019 (May 13, 2019), XP051728540, 6 Pages, Retrieved from the Internet: URL: http://www.3gpp.org/ftp/Meetings%5F3GPP%5FSYNC/ RAN1/Docs/R1%2D1907094%2Ezip, [retrieved on May 13, 2019], Reservation based scheme, p. 3, paragraph 2.3.1—p. 4, Section 1-3.

(Continued)

*Primary Examiner* — Kwang B Yao
*Assistant Examiner* — Xuan Lu
(74) *Attorney, Agent, or Firm* — Haynes and Boone, LLP/ Qualcomm

(57) ABSTRACT

Wireless communications systems and methods related to a sidelink user equipment (UE) reserving resources for multiple sidelinks are provided. A first wireless communication device communicates, with a second wireless communication device, a reservation indicating a plurality of reserved resources for a plurality of sidelink communications. The first wireless communication device communicates, with a third wireless communication device, a first sidelink communication of the plurality of sidelink communications using a first resource of the plurality of reserved resources.

23 Claims, 13 Drawing Sheets

(51) Int. Cl.
    *H04L 67/133*     (2022.01)
    *H04L 67/12*     (2022.01)
    *H04W 16/14*     (2009.01)
    *H04W 72/0446*     (2023.01)
    *H04W 72/23*     (2023.01)
    *H04W 76/14*     (2018.01)

(52) U.S. Cl.
    CPC ....... *H04W 72/02* (2013.01); *H04W 72/1263* (2013.01); *H04W 72/20* (2023.01)

(58) Field of Classification Search
    USPC .......................................................... 370/329
    See application file for complete search history.

(56) References Cited

U.S. PATENT DOCUMENTS

| | | | |
|---|---|---|---|
| 2020/0260472 A1* | 8/2020 | Ganesan | H04W 72/20 |
| 2020/0322939 A1* | 10/2020 | Cao | H04W 72/02 |
| 2021/0105104 A1* | 4/2021 | Cao | H04L 1/1896 |
| 2021/0219268 A1* | 7/2021 | Li | H04W 80/02 |
| 2021/0314962 A1* | 10/2021 | Ashraf | H04W 24/10 |
| 2021/0392618 A1* | 12/2021 | Hedayat | H04W 72/1278 |

OTHER PUBLICATIONS

International Search Report and Written Opinion—PCT/US2020/063180—ISA/EPO dated Mar. 12, 2021.

NTT DoCoMo., et al., "NR Sidelink Resource Allocation Mechanism Mode 2", 3GPP TSG RAN WG1 #98, 3GPP Draft; R1-1909187, NR Sidelink Resource Allocation Mechanism Mode 2, 3rd Generation Partnership Project (3GPP), Mobile Competence Centre; 650, Route Des Lucioles; F-06921 Sophia-Antipolis Cedex vol. RAN WG1, No. Prague, Czech Rep; Aug. 26, 2019-Aug. 30, 2019, Aug. 17, 2019 (Aug. 17, 2019), 7 Pages, XP051765792, Retrieved from the Internet: URL: http://www.3gpp.org/ftp/tsg_ran/WG1_RL1/TSGR1_98/Docs/R1-1909187.zip [retrieved on Aug. 17, 2019] Figures 1, 2 Sections 1-3.

* cited by examiner

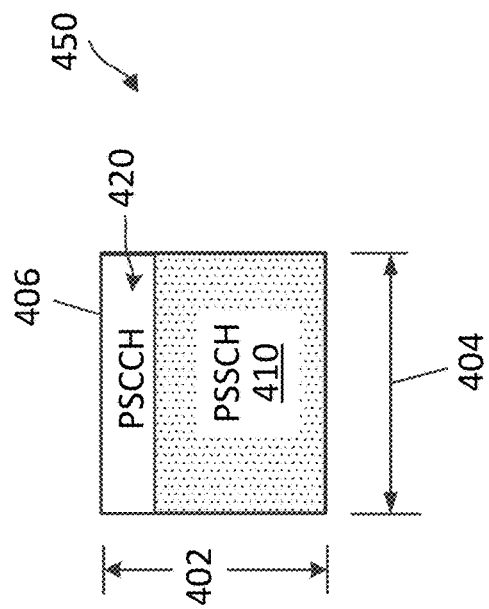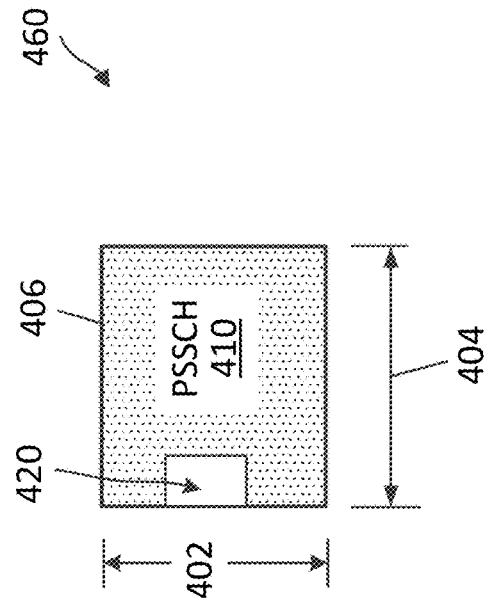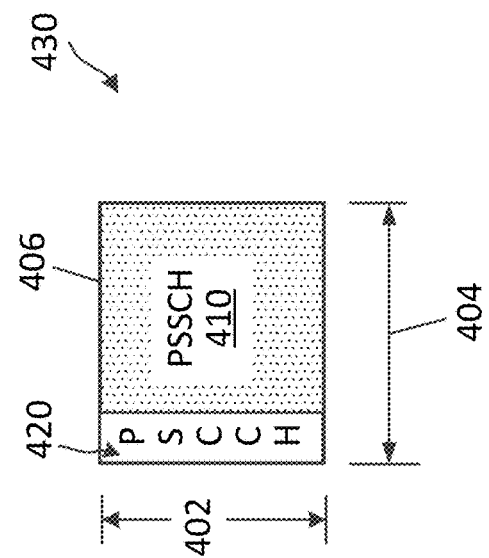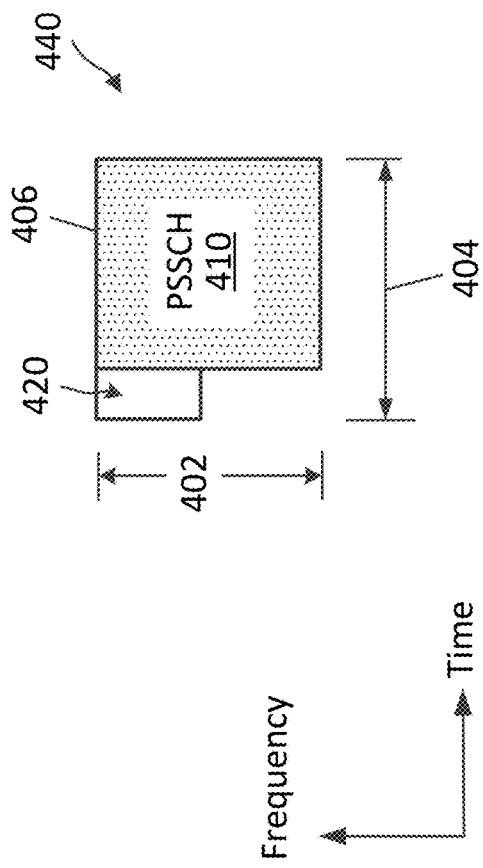

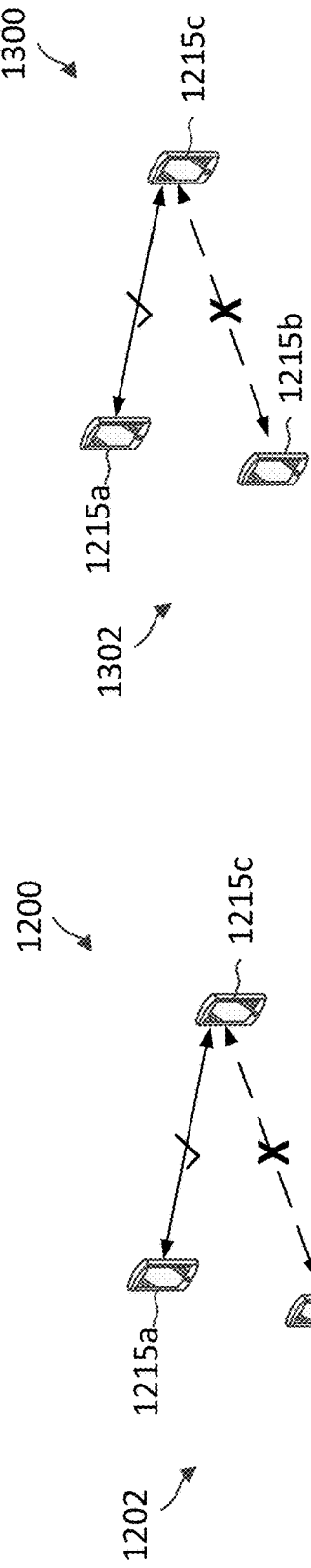
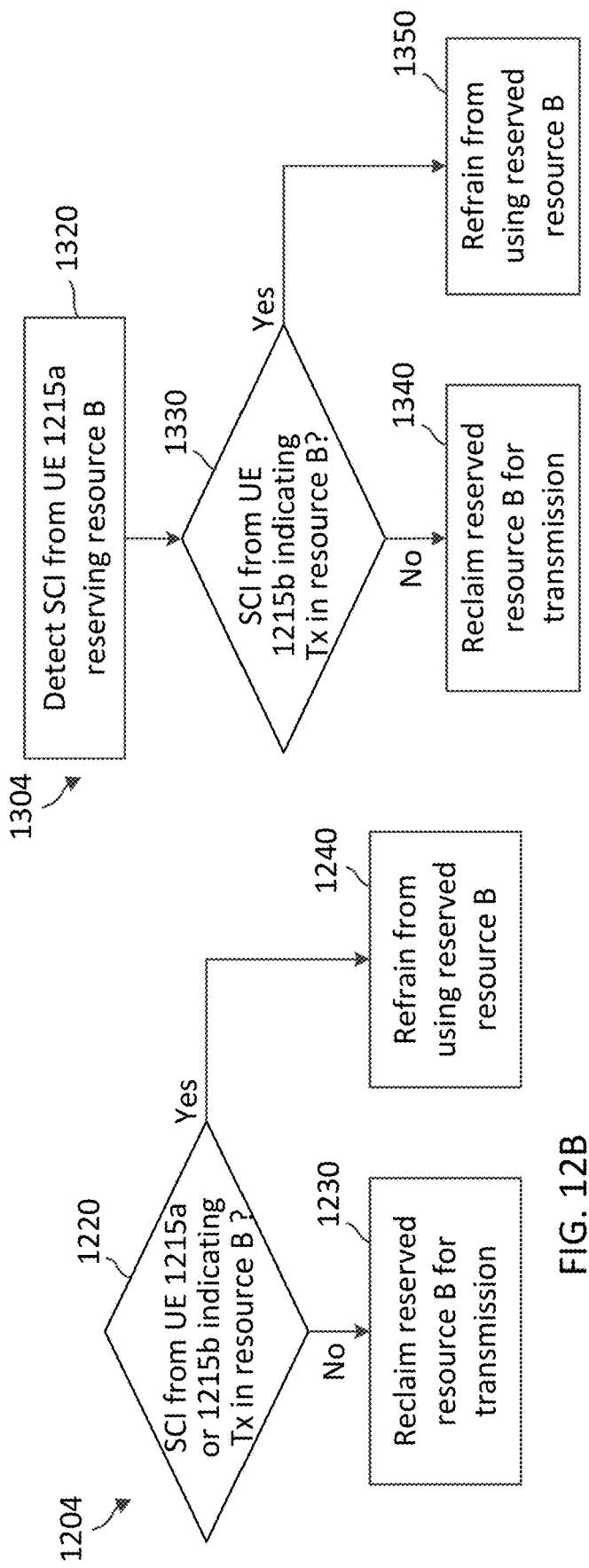
FIG. 13A
FIG. 13B
FIG. 12A
FIG. 12B

RESOURCE RESERVATION FOR MULTIPLE SIDELINKS

CROSS REFERENCE TO RELATED APPLICATIONS

The present application claims priority to and the benefit of U.S. Provisional Patent Application No. 62/945,037, filed Dec. 6, 2019, which is hereby incorporated by reference in its entirety as if fully set forth below and for all applicable purposes.

TECHNICAL FIELD

This application relates to wireless communication systems, and more particularly to a sidelink user equipment (UE) reserving resources for multiple sidelinks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a reservation indicating a plurality of reserved resources for a plurality of sidelink communications; and communicating, by the first wireless communication device with a third wireless communication device, a first sidelink communication of the plurality of sidelink communications using a first resource of the plurality of reserved resources.

In an additional aspect of the disclosure, an apparatus includes a transceiver configured to communicate, with a second wireless communication device, a reservation indicating a plurality of reserved resources for a plurality of sidelink communications; and communicate, with a third wireless communication device, a first sidelink communication of the plurality of sidelink communications using a first resource of the plurality of reserved resources.

In an additional aspect of the disclosure, a non-transitory computer-readable medium having program code recorded thereon, the program code includes code for causing a first wireless communication device to communicate, with a second wireless communication device, a reservation indicating a plurality of reserved resources for a plurality of sidelink communications; and code for causing the first wireless communication device to communicate, with a third wireless communication device, a first sidelink communication of the plurality of sidelink communications using a first resource of the plurality of reserved resources.

In an additional aspect of the disclosure, an apparatus includes means for communicating, with a second wireless communication device, a reservation indicating a plurality of reserved resources for a plurality of sidelink communications; and means for communicating, with a third wireless communication device, a first sidelink communication of the plurality of sidelink communications using a first resource of the plurality of reserved resources.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4A illustrates a physical sidelink control channel (PSCCH)/physical sidelink shared channel (PSSCH) multiplexing configuration according to some aspects of the present disclosure.

FIG. 4B illustrates a PSCCH/PSSCH multiplexing configuration according to some aspects of the present disclosure.

FIG. 4C illustrates a PSCCH/PSSCH multiplexing configuration according to some aspects of the present disclosure.

FIG. 4D illustrates a PSCCH/PSSCH multiplexing configuration according to some aspects of the present disclosure.

FIG. 12A illustrates a sidelink communication scenario according to some aspects of the present disclosure.

FIG. 12B is a flow diagram of a sidelink communication method according to some aspects of the present disclosure.

FIG. 13A illustrates a sidelink communication scenario according to some aspects of the present disclosure.

FIG. 13B is a flow diagram of a sidelink communication method according to some aspects of the present disclosure.

DETAILED DESCRIPTION

Figure 1:
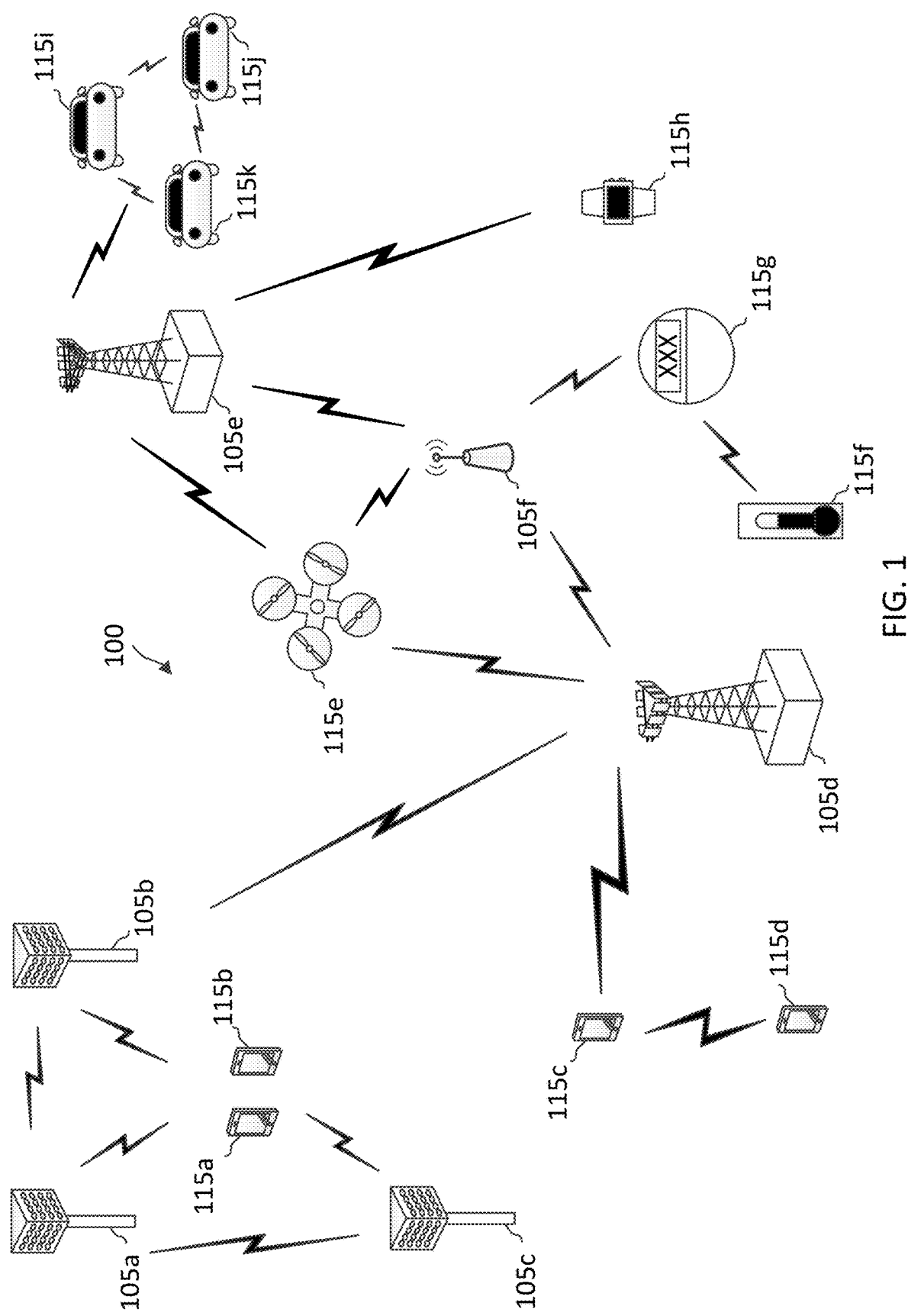
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In NR vehicle-to-everything (V2X), a transmitting UE may initiate SCI and sidelink data transmission to a peer or receiving UE. The transmitting UE is responsible for selecting resources for the sidelink transmission, for example, by performing channel sensing.

The present application describes mechanisms for a sidelink UE to reserve multiple sidelink resources for multiple sidelinks. A sidelink resource is a time-frequency resource including one or more resource elements. For instance, a sidelink resource may include a number of subcarriers in frequency and a number of symbols, a number of mini-slots 208, or a number of slots 202 in time. In some aspects, a first UE may reserve multiple sidelink resources and may transmit first SCI indicating a reservation for the multiple reserved sidelink resources. In some aspects, the first SCI may indicate an assignment of each reserved resource (e.g., one or more resource elements). For instance, the first SCI may indicate a first reserved resource of the multiple reserved resources assigned for transmission by the first UE to a second UE and may indicate a second reserved resource of the multiple reserved resources assigned for transmission by the second UE to the first UE or to a third UE different from the first UE. Accordingly, the first UE may transmit sidelink data to the second UE using the first reserved resource and the second UE may subsequently transmit sidelink data to the first UE or the third UE using the second reserved resource. In some aspects, the second UE may transmit second SCI (in the PSCCH of the second resource) before transmitting sidelink data in the second resource. In this regard, the second SCI may repeat the reservation for the second resource. In some aspects, the second UE may duplicate the first SCI in the PSCCH of the second resource.

In some aspects, SCI may also carry sidelink acknowledgement/negative-acknowledgement (ACK/NACK) feedback, scheduling request (SR), buffer status report (BSR), and/or a resource release indication. In some aspects, if a sidelink UE detects a reserved resource is released, the sidelink UE may use the released resource for transmission. In some aspects, if a sidelink UE detects a reservation indicating multiple reserved resources, but does not detect a sidelink UE assigned to a reserved resource indicating a transmission in the reserved resource, the sidelink UE may reclaim the resource for transmission, for example, based on a spatial reuse. In some other aspects, a sidelink UE may transmit in a resource of a multi-resource reservation when there is no reservation detected from a UE reserving the multi-resource reservation and there is no transmission indication detected from the UE assigned to the resource.

Aspects of the present disclosure can provide several benefits. For example, the reservation of multiple sidelink resources for multiple sidelinks instead of each transmitting UE performing channel sensing and reserving a resource for its own transmission can potentially reduce latency, and thus may be beneficial for ultra-reliable low-latency communication (URLLC). Additionally, the inclusion of a resource release indication in SCI allows a sidelink UE to release an unused reserved sidelink resource and allows another sidelink UE to transmit in the resource that may otherwise by wasted. Thus, the disclosed embodiments can improve resource utilization efficiency. Further, the reclaiming of a reserved resource based on a spatial reuse can further improve resource utilization efficiency.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). ABS for a macro cell may be referred to as a macro BS. ABS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW).

In some aspects, the network 100 may provision for sidelink communications to allow a UE 115 to communicate with another UE 115 without tunneling through a BS 105 and/or the core network. A transmitting UE 115 may select a resource from a resource pool for sidelink transmission, for example, based on channel sensing. For instance, the UE 115 may monitor the resource pool for SCI from other sidelink UEs 115 and may determine that a resource is available when no SCI is detected. After selecting the resource, the transmitting UE 115 may transmit SCI (e.g., in a PSCCH of the selected resource) indicating a reservation for the selected resource and/or scheduling information for the sidelink transmission. The transmitting UE 115 may subsequently transmit sidelink data (e.g., in a PSSCH of the selected resource) to a peer or receiving UE 115 according to the scheduling information. In this regard, a receiving UE is understood to be a UE that receives data (e.g., over a PSSCH) from another UE in a sidelink communication, while a transmitting UE is understood to be a UE that transmits data (e.g., over a PSSCH) to another UE in a sidelink communication. Over time, a single UE may be both a receiving UE and a transmitting UE. For example, in an initial sidelink communication a UE may be a receiving UE and in a later sidelink communication the same UE may be a transmitting UE, or vice versa.

In some aspects, a sidelink transmitting UE 115 may reserve multiple resources for communications over multiple sidelinks (e.g., the sidelinks 351, 352, and 354) by one or more other UEs 115 in addition to sidelink transmissions by the UE 115 itself. Additionally, a UE 115 may release an unused reserved resource to allow another sidelink UE 115 to reclaim the unused resources for sidelink transmissions. Further, a UE 115 may opportunistically reclaim a resource reserved for another UE 115 based on a spatial reuse. Mechanisms for reserving resources for multiple sidelink communications and reclaiming reserved resources for sidelink communication are described in greater detail herein.

Figure 2:
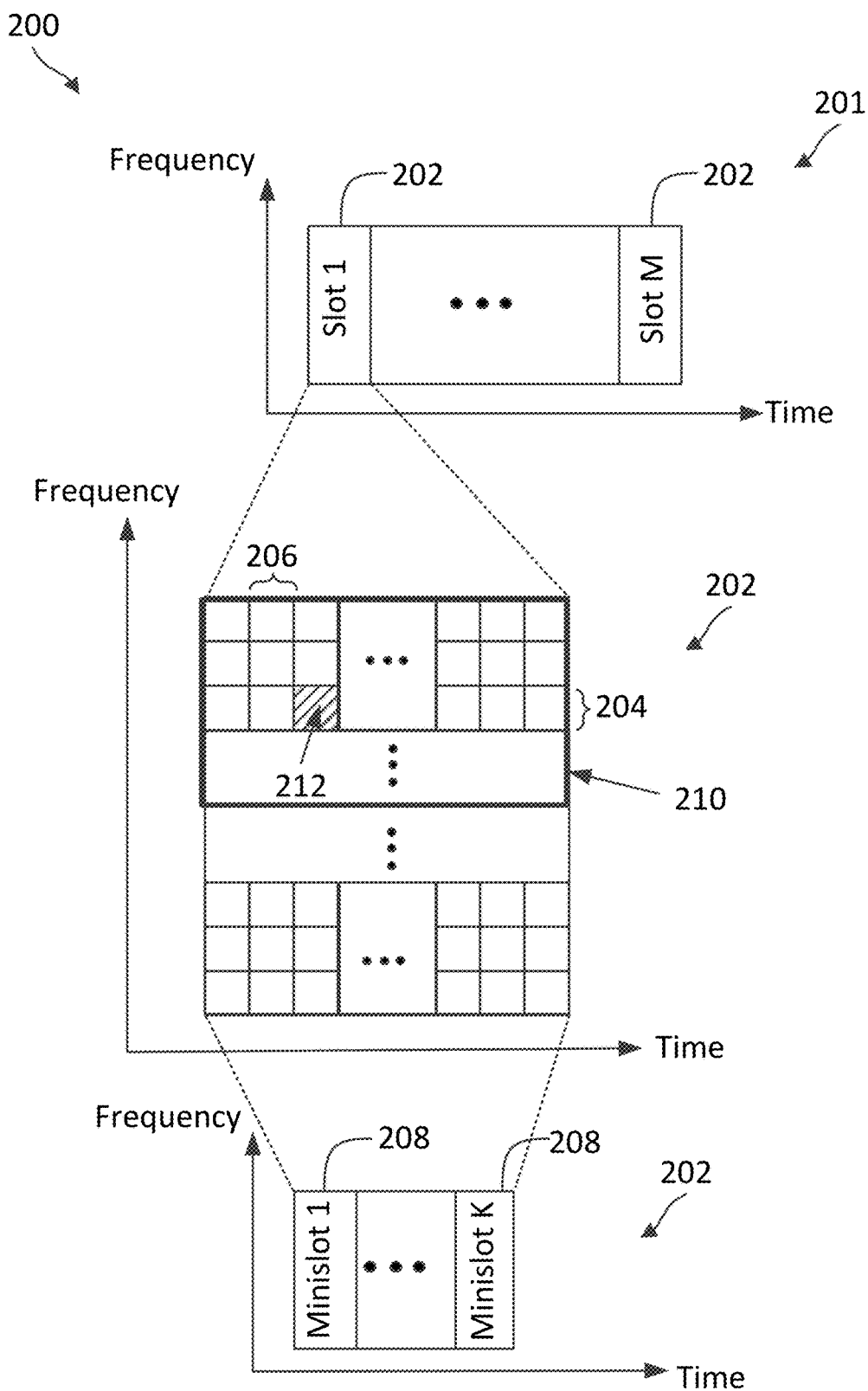
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
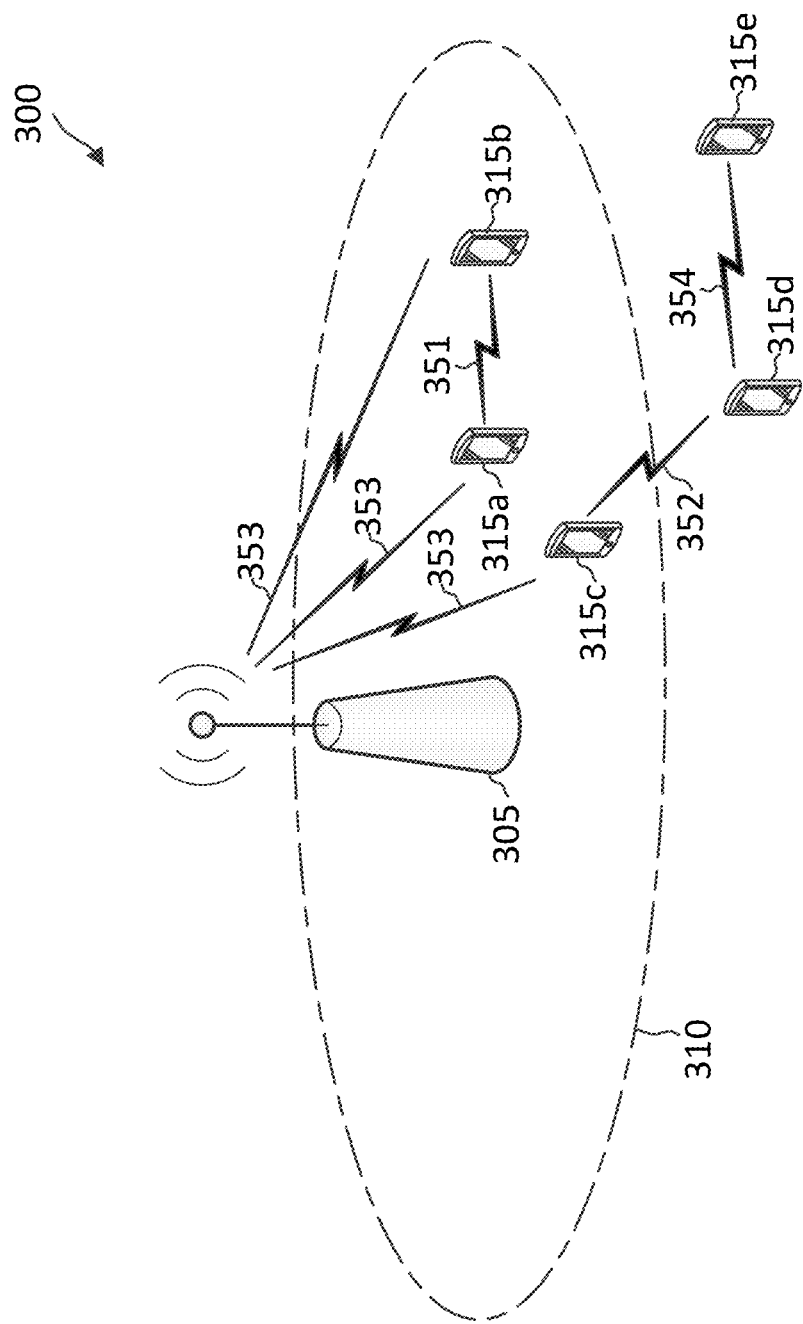
FIG. 3 illustrates a wireless communication network that provisions for sidelink communications according to some aspects of the present disclosure.

FIG. 3 illustrates an example of a wireless communication network 300 that provisions for sidelink communications according to embodiments of the present disclosure. The network 300 may be similar to the network 100. The network 300 may use a radio frame structure similar to radio frame structure 200 for communication. FIG. 3 illustrates one BSs 305 and five UEs 315 (shown as 315a, 315b, 315c, 315d, and 315e) for purposes of simplicity of discussion, though it will be recognized that embodiments of the present disclosure may scale to any suitable number of UEs 315 and/or BSs 305 (e.g., the about 3, 3, 6, 7, 8, or more). The BS 305 and the UEs 315 may be similar to the BSs 105 and the UEs 115, respectively. The BSs 305 and the UEs 315 may communicate over the same spectrum.

In the network 300, some of the UEs 315 may communicate with each other in peer-to-peer communications. For example, the UE 315a may communicate with the UE 315b over a sidelink 351, the UE 315c may communicate with the UE 315d over another sidelink 352, and the UE 315d may communicate with the UE 315e over yet another sidelink 354. The sidelinks 351, 352, and 354 are unicast bidirectional links. Some of the UEs 315 may also communicate with the BS 305 in a UL direction and/or a DL direction via communication links 353. For instance, the UE 315a, 315b, and 315c are within a coverage area 310 of the BS 305, and thus may be in communication with the BS 305. The UE 315d and UE 315e are outside the coverage area 310, and thus may not be in direct communication with the BS 305. In some instances, the UE 315c may operate as a relay for the UE 315d and/or UE 315e to reach the BS 305. In some aspects, some of the UEs 315 are associated with vehicles (e.g., similar to the UEs 115i-k) and the communications over the sidelinks 351 and/or 352 may be C-V2X communications. C-V2X communications may refer to communications between vehicles and any other wireless communication devices in a cellular network.

FIGS. 4A-4D illustrates various PSCCH/PSSCH multiplexing configurations for sidelink communication. In FIGS. 4A-4D, the PSCCH/PSSCH multiplexing configurations 430, 440, 450, and 460 may be employed by BSs such as the BSs 105 and 305 and/or UEs such as the UEs 115 and/or 315 in a network such as the networks 100 and/or 300. In particular, the UEs may communicate with each other over sidelinks (e.g., the sidelinks 351 and 352) using resources configured as shown in the configuration 430, 440, 450, or 460. Additionally, the x-axes represent time in some arbitrary units, and the y-axes represent frequency in some arbitrary units.

FIG. 4A illustrates a PSCCH/PSSCH multiplexing configuration 430 according to some aspects of the present disclosure. In the configuration 430, a PSSCH 410 and a PSCCH 420 are time-multiplexed in a sidelink resource 406. The sidelink resource may span a frequency band 402 and a time duration 404. The sidelink resource 406 may have a transmission structure similar to the structure shown in FIG. 2 discussed above. For instance, the sidelink resource 406 may include a number of subcarriers 204 in frequency and a number of symbols 206, a number of mini-slots 208, or a number of slots 202 in time. In some instances, the frequency band 402 may be within a licensed band. In some other instances, the frequency band 402 may be within a shared radio frequency band in a shared spectrum or an unlicensed spectrum. In some instances, the frequency band 402 may be within a 5 gigahertz (GHz) band or a 6 GHz band and may be shared among multiple network operating entities and/or multiple radio access technologies (RATs).

FIG. 4B illustrates a PSCCH/PSSCH multiplexing configuration 440 according to some aspects of the present disclosure. The configuration 440 is substantially similar to the configuration 430, where the PSSCH 410 is time-multiplexed with the PSCCH 420. However, the PSCCH 420 may occupy a narrower bandwidth than the PSSCH 410.

FIG. 4C illustrates a PSCCH/PSSCH multiplexing configuration 450 according to some aspects of the present disclosure. In the configuration 450, the PSSCH 410 and the PSCCH 420 are frequency-multiplexed in the sidelink resource 406.

FIG. 4D illustrates a PSCCH/PSSCH multiplexing configuration 460 according to some aspects of the present disclosure. In the configuration 460, the PSSCH 410 and the PSCCH 420 are multiplexed in time and frequency in the sidelink resource 406. In some aspects, the configuration 460 may be suitable for sidelink transmissions that use cyclic-prefix-OFDM (CP-OFDM) waveforms.

A network (e.g., the networks 100 and/or 300) may utilize any of the PSCCH/PSSCH multiplexing configurations 430, 440, 450, or 460 for sidelink communication. Prior to a sidelink communication, the PSCCH/PSSCH multiplexing configuration, the starting symbol (e.g., the symbols 206), the number of symbols, and/or the number of subcarriers (e.g., the subcarriers 204) for a PSSCH 410 and/or the number of symbols and the number of subcarriers for a PSCCH 420 are known to all UEs (e.g., in the UEs 115 and 315) in the network, for example, based on a pre-configuration by the BS. In each resource 406, the PSCCH 420 is associated with the PSSCH 410. For instance, the PSCCH 420 may carry SCI indicating scheduling information for sidelink data carried in the corresponding PSSCH 410. In some instances, a resource 406 may also include a physical sidelink feedback channel (PSFCH), for example, time-multiplexed with the PSCCH 420 and PSCCH 420. The PSFCH may be used to carry HARQ ACK/NACKs when a sidelink communication utilizes HARQ.

During a sidelink communication, a transmitting UE (e.g., the UEs 115 and/or 315) may initiate the sidelink transmission by transmitting SCI in a PSCCH 420 (of a resource 406) indicating scheduling information for sidelink data in the corresponding PSSCH 410. The scheduling information may indicate time and/or frequency resources in the PSSCH 410 where sidelink data is to be transmitted. The scheduling information may indicate transmission parameters, such as a MCS level and/or a DMRS pattern, to be used for transmitting the sidelink data. A receiving UE may monitor for SCI in the PSCCH 420 and receive sidelink data based on detected SCI. The receiving UE may determine whether the receiving UE is the intended destination based on a destination ID included in the sidelink data.

There are two modes of sidelink resource allocations. In mode-1, a BS (e.g., the BSs 105 and/or 305) may determine sidelink resources (e.g., for PSCCH 420, PSSCH 410, and PSFCH) for a transmitting UE. In other words, the BS determines a sidelink resource on behalf of the transmitting UE. The BS may transmit a dynamic grant (e.g., via PDCCH DCI) to the transmitting UE. The dynamic sidelink grant may indicate the sidelink resource. The transmitting UE may transmit SCI in the PSCCH 420 to indicate a sidelink data resources (in the PSSCH 410) to a receiving UE.

In mode-2, a transmitting UE may determine sidelink resources instead of a BS. In this regard, sidelink UEs may be preconfigured with a resource pool for sidelink operations. A resource pool is a set of resources that are allocated for sidelink communications. The resource pool includes a plurality of resource elements (e.g., time-frequency resources). The set of resources of the resource pool may include contiguous resource blocks, non-contiguous resource blocks, or a combination thereof. In some examples, resources may be indicated as particular RBs (e.g., RBs 210), time resources may be indicated as one or more slots (e.g., slots 202, mini-slots 208, etc.), frequency resources may be indicated as a subband or subchannel, or the resources can be indicated differently. For instance, the resource pool may include a number of sidelink resources similar to the resources 406 arranged as shown in the configuration 430, 440, 450, or 460 of FIG. 4A, 4B, 4C, or 4D, respectively. The time and frequency resource locations of the PSCCH 420 are known based on a selected PSCCH/PSSCH multiplexing configuration (e.g., the configurations 430, 440, 450, and 460). A transmitting UE may perform channel sensing in the PSCCH 420 regions of the resource pool, for example, by monitoring and decoding SCIs transmitted by other sidelink UEs. Based on the SCI monitoring and decoding, the transmitting UE may determine whether a sidelink resource 406 is being used by another sidelink UE and how long and/or in which subband a sidelink UE may occupy a sidelink resource 406. The transmitting UE may also perform sidelink channel measurements to determine interference in the sidelink resources 406 within the resource pool. The transmitting UE may select a resource 406 from the resource pool for a sidelink communication based on the monitoring and/or channel measurements. For example, the selected resource 406 may be a resource with a minimal amount of interference among resources in the resource pool as seen by the transmitting UE. The sidelink communication may be an initial transmission or a retransmission, for example, when using HARQ as discussed above. In general, a sidelink transmitting UE is responsible for reserving or selecting sidelink resources for its own transmissions to a peer or receiving UE.

The present disclosure provides techniques to extend sidelink resource reservation to multiple sidelinks, where a first sidelink UE (e.g., the UE 315c of FIG. 3) may reserve multiple resources for transmission to a second sidelink UE (e.g., the UE 315d of FIG. 3) and for transmission from the second sidelink UE back to the first sidelink UE or to a third sidelink UE (e.g., the UE 315e of FIG. 3). The multiple sidelink resource reservation can reduce communication latency, for example, to facilitate URLLC.

Figure 5:
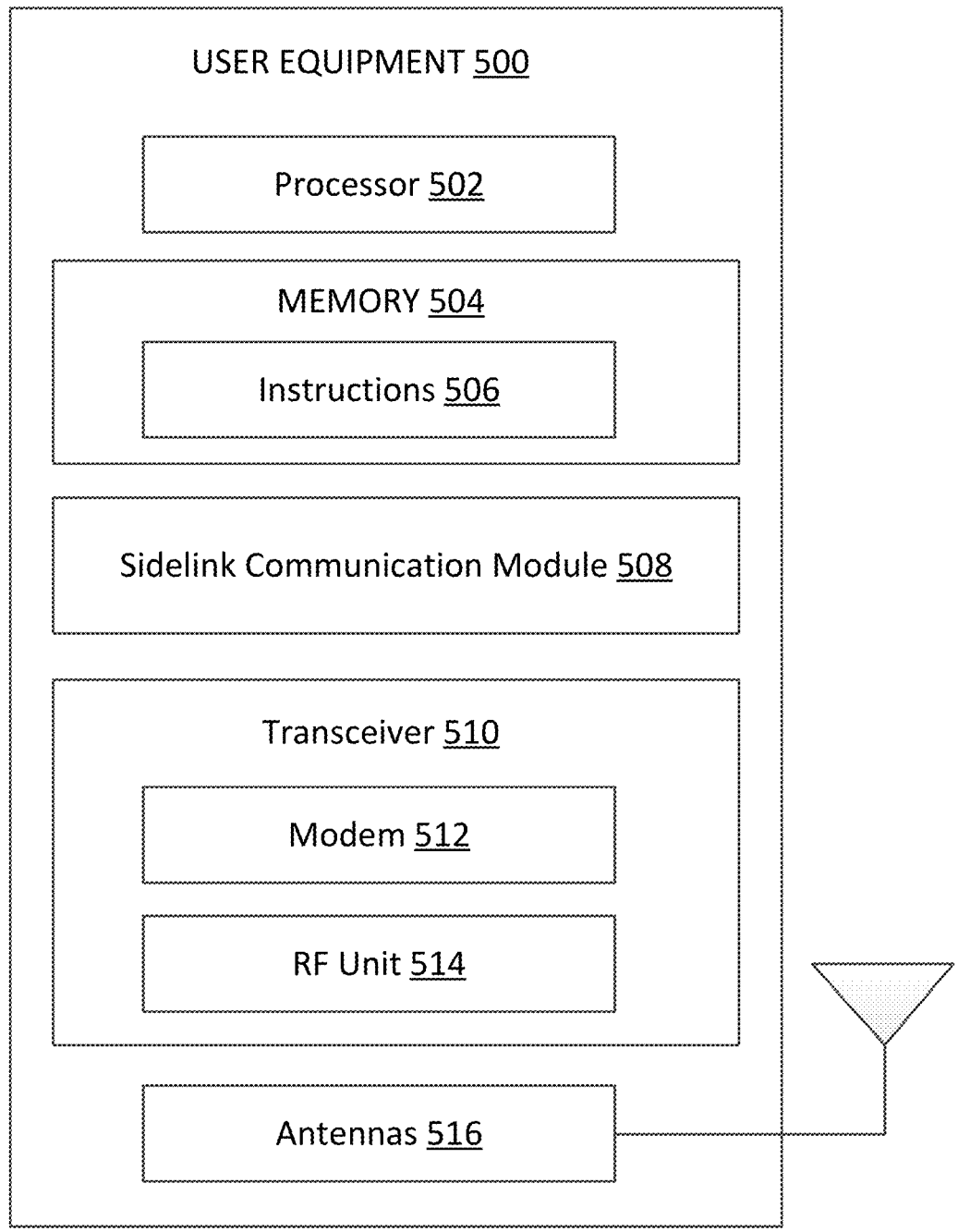
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1 or a UE 315 of FIG. 3. As shown, the UE 500 may include a processor 502, a memory 504, a sidelink communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-3, 4A-4D, 7A-7B, 8A-8B, 9A-9B, 10A-10B, 11A-11B, 12A-12B, 13A-13B, and 14. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 1-3, 4A-4D, 7A-7B, 8A-8B, 9A-9B, 10A-10B, 11A-11B, 12A-12B, 13A-13B, and 14. In some aspects, the UE 500 may function as a transmitting UE reserving multiple resources for multiple sidelinks. In this regard, the sidelink communication module 508 is configured to reserve multiple sidelink resources, transmit first SCI indicating a reservation for the multiple reserved sidelink resources. In some aspects, the first SCI may indicate an assignment of each reserved resource. As explained above, a sidelink resource can include one or more resource elements that span a certain frequency and a certain time. Accordingly, each reserved resource can include one or more resource elements. For instance, the first SCI may indicate a first reserved resource (e.g., one or more resource elements) of the multiple reserved resources assigned for transmission by the UE 500 to a second UE and may indicate a second reserved resource (e.g., one or more resource elements) of the multiple reserved resources assigned for transmission by the second UE to the UE 500 or to another UE. Thus, the sidelink communication module 508 is configured to transmit sidelink data to the second UE using the first reserved resource. In some aspects, the sidelink communication module 508 is configured to receive, from a BS (e.g., the BSs 105 and/or 305), a configuration (e.g., time and frequency locations for resources usable for sidelinks) for a resource pool for sidelink communication, store the configuration information in the memory 504, perform channel sensing according to the resource pool configuration information, and select the multiple sidelink resources from the resource pool based on the channel sensing.

In some aspects, the UE 500 may be a UE assigned with a resource from a multi-resource reservation. In this regard, the sidelink communication module 508 is configured to monitor for SCI, detect a multi-resource reservation from another UE reserving a resource for the UE 500, transmit sidelink data using the reserved resource. In some aspects, the sidelink communication module 508 is configured to transmit SCI repeating an indication of the resource reserved for the UE 500 prior to the sidelink data transmission. In some aspects, the sidelink communication module 508 is configured to transmit SCI repeating the entire multi-resource reservation (e.g., indicating all resources reserved by the multi-resource reservation.

In some aspects, the sidelink communication module 508 is configured to include an HARQ ACK/NACK, an SR, and/or a BSR in SCI. The HARQ ACK/NACK may be a feedback for previous sidelink data received by the UE 500. The SR and/or BSR may be a resource request for transmission over a sidelink. In some instances, the SR and/or BSR may be a request for transmitting over a sidelink to the UE that reserved the multi-resource reservation. In some other instances, the SR and/or BSR may indicate that the request is for transmitting a UE different from the UE that reserved the multi-resource reservation.

In some aspects, the sidelink communication module 508 is configured to monitor for SCI indicating a release indication for a reserved resource and transmit in the resource upon detecting a release of the resource. In some aspects, the sidelink communication module 508 is configured to monitor for SCI indicating a multi-resource reservation (reserving multiple resources for multiple sidelinks) and for SCI indicating a transmission in a reserved resource, and reclaim the resource for transmission if no SCI indicating a transmission in the reserved resource is detected. In some aspects, the sidelink communication module 508 is configured to refrain from transmitting in a resource if SCI including a multi-resource reservation indicating the resource is detected (from the reserving UE) or SCI indicating a transmission in the resource is detected (from the UE assigned to the resource by the multi-resource reservation). Mechanisms for reserving multiple sidelink resources for multiple sidelinks are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the sidelink communication module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., PSCCH, PSSCH, PSFCH, SCI, HARQ ACK/NACK, BSR, SR, resource release indication) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., resource pool configuration, RRC configuration) to the sidelink communication module 508 for processing. The antennas 516 may include multiple antennas of similar or different designs in order to sustain multiple transmission links. The RF unit 514 may configure the antennas 516.

In an example, the transceiver 510 is configured to communicate, with a second wireless communication device, a reservation indicating a plurality of reserved resources for a plurality of sidelink communication and communicate, with a third wireless communication device, a first sidelink communication of the plurality of sidelink communications using a first resource of the plurality of reserved resources, for example, by coordinating with the sidelink communication module 508. The first resource may include a subset of the plurality of reserved resources (e.g., one or more resource elements from the plurality of reserved resources).

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
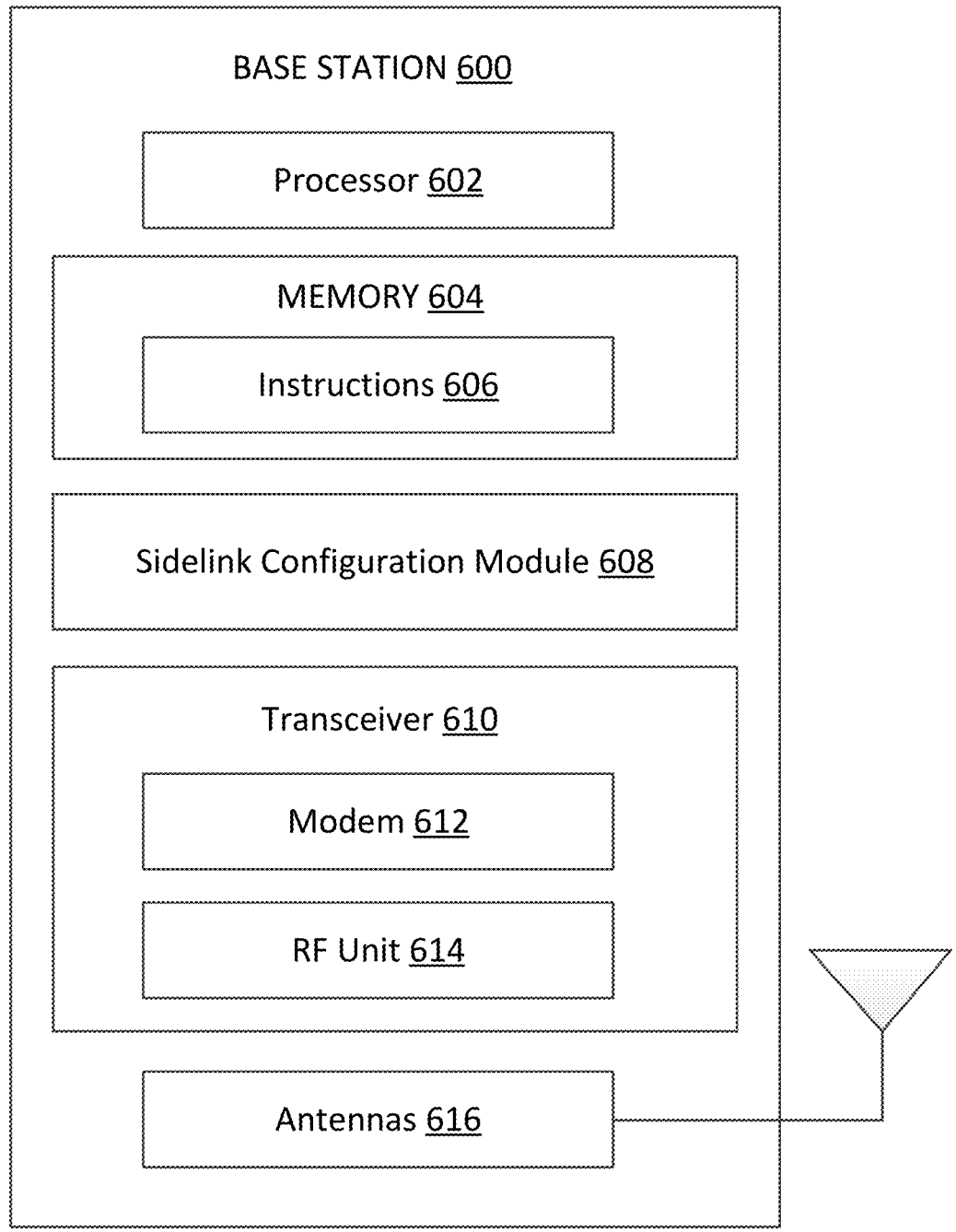
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, a sidelink configuration module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-3, 4A-4D, 7A-7B, 8A-8B, 9A-9B, 10A-10B, and 11A-11B. Instructions 606 may also be referred to as code, which may be interpreted broadly to include any type of computer-readable statement(s) as discussed above with respect to FIG. 5.

The sidelink configuration module 608 may be implemented via hardware, software, or combinations thereof. For example, the sidelink configuration module 608 may be implemented as a processor, circuit, and/or instructions 606 stored in the memory 604 and executed by the processor 602. In some instances, the sidelink configuration module 608 can be integrated within the modem subsystem 612. For example, the sidelink configuration module 608 can be implemented by a combination of software components (e.g., executed by a DSP or a general processor) and hardware components (e.g., logic gates and circuitry) within the modem subsystem 612.

The sidelink configuration module 608 may be used for various aspects of the present disclosure, for example, aspects of FIGS. 1-3, 4A-4D, 7A-7B, 8A-8B, 9A-9B, 10A-10B, and 11A-11B. The sidelink configuration module 608 is configured to allocate a resource pool for sidelink communications, transmits a configuration to a UE (e.g., by the UEs 115, 315, and/or 500) to indicate the resource pool configuration (e.g., time and/or frequency locations of resources in the pool). Mechanisms for facilitating reservation of multiple resources for multiple sidelinks are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., sidelink resource pool configuration, sidelink grants) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., sidelink CQI, sidelink channel sensing information, HARQ ACK/NACK, BSR) to the sidelink configuration module 608 for processing. The antennas 616 may include multiple antennas of similar or different designs in order to sustain multiple transmission links.

In an example, the transceiver 610 is configured to, transmit sidelink grant to a sidelink receiving UE, receive sidelink channel information, sidelink BSRs, and/or sidelink ACK/NACK from the sidelink receiving UE, for example, by coordinating with the sidelink configuration module 608.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7A:
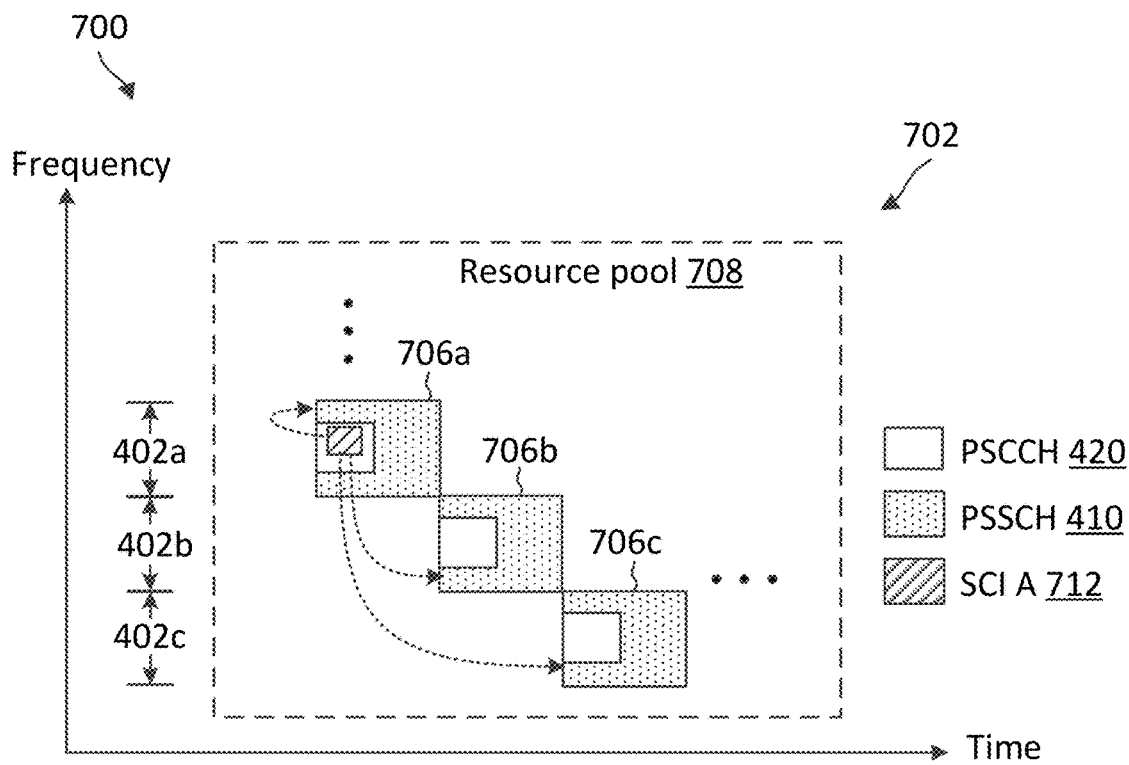
FIG. 7A illustrates a sidelink resource reservation for multiple sidelinks according to some aspects of the present disclosure.
Figure 7B:
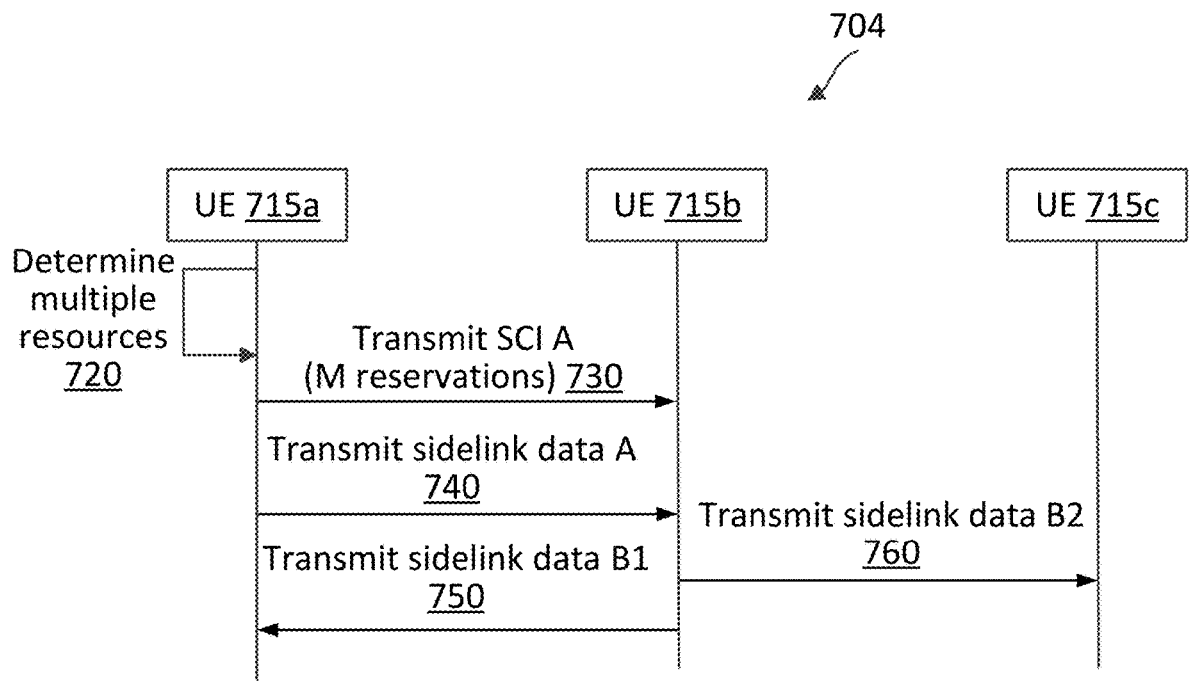
FIG. 7B is a signaling diagram illustrating a sidelink communication method according to some aspects of the present disclosure.

FIG. 7A will be discussed in relation to FIG. 7B to illustrate a sidelink communication scheme 700. The scheme 700 may be employed by UEs such as the UEs 115, 315, and/or 500 in a network such as the networks 100 and 300. In particular, a sidelink transmitting UE may reserve multiple sidelink resources for its own transmission and for transmissions by one or more other UEs over one or more other sidelinks (e.g., the sidelinks 351, 352, and/or 354) as shown in the scheme 700. In the illustrated example of FIGS. 7A and 7B, a UE 715a corresponds to a sidelink transmitting UE that selects or reserves multiple sidelink resources, which may be used by the UE 715a to transmit to a peer or receiving UE 715b and for the UE 715b to transmit to the UE 715a and/or another UE 715c. The UEs 715a, 715b, and 715c are substantially similar to the UEs 115, 315, and/or 500. In some aspects, the UEs 715a, 715b, and 715c may correspond to the UEs 315c, 315d, and 315e, respectively.

While the scheme 700 is illustrated with three sidelink UEs, the scheme 700 may be applied by a sidelink transmitting UE to sequentially reserve resources for any suitable number of UEs (e.g., about 3, 4, 5 or more) over multiple sidelinks, for example, in a chained manner. In general, a transmitting $UE_i$ may reserve resources sequentially for K number of UEs, denoted as $UE_{i+1}$ to $UE_{i+K}$, where K may be 1, 2, 3 or more. For instance, the $UE_i$ reserves one or more resources for the $UE_i$ to transmit to a $UE_{i+1}$, one or more resources for a $UE_{i+1}$ to transmit to a $UE_{i+2}$, one or more resources for a $UE_{i+2}$ to transmit to a $UE_{i+3}$, and so on.

FIG. 7A illustrates a resource reservation 702 for multiple sidelinks according to some aspects of the present disclosure. In FIG. 7A, the x-axis represents time in some arbitrary units, and the y-axis represents frequency in some arbitrary units. In general, time resources include one or more symbols (which can be grouped in slots or mini-slots), and frequency resources include one or more subcarriers (which can be grouped in subbands or subchannels) as discussed in relation to FIG. 2. For purposes of simplicity of discussion, the resource reservation 702 is illustrated using the PSCCH/PSSCH multiplexing configuration 460 of FIG. 4D and uses the same reference numerals as in FIG. 4D. However, the scheme 700 may utilize any other suitable PSCCH/PSSCH multiplexing configuration (e.g., the configurations 430, 440, or 450). FIG. 7B is a signaling diagram illustrating a sidelink communication method 704 according to some aspects of the present disclosure. The method 704 may be implemented among the sidelink UEs 715a, 715b, and 715c. As illustrated, the method 704 includes a number of enumerated steps, but embodiments of the method 704 may include additional steps before, after, and in between the enumerated steps. In some aspects, one or more of the enumerated steps may be omitted or performed in a different order.

At step 720, the UE 715a determines multiple sidelink resources for transmission to the UE 715b and for the UE 715b to transmit to the UE 715a and/or the UE 715c. In this regard, the UE 715a may select multiple resource 706a, 706b, and 706c (shown in FIG. 7A) similar to the resources 406 from a resource pool 708. The resource pool 708 may include a number of resources similar to the resource 706. In some aspects, the resource pool 708 may be preconfigured, for example, by a BS (e.g., the BSs 105, 305, and/or 600) while the UE 715a is within a coverage of the BS. The UE 715a may store configuration information related to the resource pool 708 in a memory, such as the memory 504. While FIG. 7A illustrates the resource pool 708 in a continuous time-frequency region, the resource pool 708 may include resources distributed in time and/or frequency. Additionally, while FIG. 7A illustrates the resources 706a, 706b, and 706c as resources over different subchannels or subbands 402 in different time intervals, the reserved resources 706a, 706b, and 706c may be located at any suitable time-frequency locations within the resource pool 708.

In some aspects, the UE 715a may select the resources 706a, 706b, and 706c by performing channel sensing and/or measurements on the resource pool, for example, on a per subchannel or subband 402 basis. In this regard, the UE 715a may perform the sensing in each subband 402a, 402c, and 402c based on monitoring and/or decoding of SCIs transmitted by other UEs in the PSCCH region of the resource pool as discussed above. For instance, the UE 715a may receive a signal from each frequency band 402a, 402b, and 402c, perform blind decoding in the PSCCH region to determine whether an SCI is detected from the signal. As an example, the UE 715a may reserve the resource 706a for transmission to the UE 715b and may reserve the resources 706b and 706c for transmissions by the UE 715b. In some instances, the UE 715a may utilize one or more components, such as the processor 502, the sidelink communication module 508, the transceiver 510, the modem 512, and the one or more antennas 516, to perform channel sensing, channel measurements, and/or reserve the sidelink resource 706. In some aspects, some sidelink communications may have a higher service priority than other sidelink communications. When the UE 715a is reserving resources for high priority services, the UE 715a may disregard reservations for lower priority services. In other words, when a resource is reserved for a low-priority service, the UE 715a may override the low-priority reservation and reserve the resource.

At step 730, the UE 715a transmits SCI A indicating the reservations for the resources 706a, 706b, and 706c. The UE 715a may transmit SCI A as shown in FIG. 7A, where the SCI A is shown as SCI A 712 carried in a PSCCH 420 of the resource 706a and indicating the reserved resources 706a, 706b, and 706c as shown by the dotted arrows. In some aspects, the SCI A 712 may indicate whether a reserved resource 706a, 706b, 706c is reserved for transmission by the UE 715a or for transmission by the UE 715b or whether all reserved resources 706a, 706b, 706c are reserved for the UE 715a. In some aspects, the SCI A 712 may indicate a total M number of reservations. In the illustrated example of FIG. 7A, the SCI A 712 may indicate a total of 3 reservations. In some other aspects, the SCI A 712 may indicate a total number of subchannels reserved for the multiple reservations. In some aspects, the UE 715a may assign each resource 706a, 706b, 706c to a particular sidelink (e.g., the sidelinks 351, 352, and/or 354) and the SCI A 712 may indicate the link assignment for each resource 706a, 706b, 706c. In other words, the SCI A 712 may indicate reserved resources per sidelink. For instance, the SCI A may indicate that the resource 706a is reserved for transmission by the UE 715a to the UE 715b, the resource 706b is reserved for transmission by the UE 715b to the UE 715a, and the resource 706c is reserved for transmission by the UE 715b to the UE 715c. In some instances, the UE 715a may utilize one or more components, such as the processor 502, the sidelink communication module 508, the transceiver 510, the modem 512, and the one or more antennas 516, to transmit the SCI A 712.

In some aspects, the SCI A 712 be part of a two-staged SCI, where the SCI A 712 is a first stage SCI. In this regard, a first stage SCI may be carried in a PSCCH 420 and may include information related to channel sensing. For instance, the first stage SCI may indicate resource reservations, for instance, time slots or time intervals and/or frequency subchannels where the reserved resources are located and/or a periodicity of the reserved resource. As such, other UEs may decode the first stage SCI and determine whether a resource is reserved or available based on the first stage SCI. A second stage SCI may be transmitted in a PSSCH 410 to indicate transmission parameters that are related to the transmission in the PSSCH 410. In some instances, the second stage SCI may be encoded using a polar code. In some instances, the second stage SCI may be demodulated and/or decoded based on a PSSCH DMRS carried in the PSSCH.

At step 740, the UE 715a transmits sidelink data A to the UE 715b in the PSSCH 410 of the resource 706a based on the SCI A 712. In some aspects, when the SCI A 712 is a first stage SCI, the UE 715a may transmit a second stage SCI in the PSSCH of the resource 706a. The second stage SCI may indicate transmission parameters, such as a MCS, used for transmitting the sidelink data. In some instances, the UE 715a may utilize one or more components, such as the processor 502, the sidelink communication module 508, the transceiver 510, the modem 512, and the one or more antennas 516, to transmit the sidelink data to the UE 715b.

At step 750, the UE 715b transmits sidelink data B1 to the UE 715a in the PSSCH 410 of the resource 706b. In this regard, the UE 715b may monitor for SCI and detect the SCI A 712. The UE 715b may decode the SCI A 712. The UE 715b may receive sidelink data A from the UE 715a based on the decoded SCI A 712. The UE 715b may transmit sidelink data B1 to the UE 715a using the resource 706b based on the SCI A 712 indicating the resource 706b reserved for the UE 715b to transmit to the UE 715a. In some instances, the UE 715b may determine transmission parameters (e.g., MCS) for the sidelink data B1 and may indicate the transmission parameters to the UE 715a, for example, via a stage two SCI in the PSSCH 410 of the resource 706b. In some instances, the UE 715b may utilize one or more components, such as the processor 502, the sidelink communication module 508, the transceiver 510, the modem 512, and the one or more antennas 516, to receive the SCI A 712, perform blind decoding to recover sidelink resource reservation information carried by SCI A 712, receive the sidelink data A in the resource 706a based on the resource reservation information, and transmit the sidelink data B1 using the resource 706 resource reservation information.

At step 760, the UE 715b transmits sidelink data B2 to the UE 715c in the PSSCH 410 of the resource 706c. In this regard, the UE 715b may determine that the SCI A 712 includes a reservation for the resource 706c for the UE 715b transmit to the UE 715c. The UE 715b may transmit the sidelink data B2 using substantially similar mechanisms as in the step 750.

In some aspects, a BS (e.g., the BSs 105, 305, and/or 600) may configure a resource usage pattern for using the resources 706 reserved by the UE 715a. For instance, the BS may indicate that the resource 706a is for is for transmission from the UE 715a to the UE 715b, the resource 706b is for is for transmission from the UE 715b to the UE 715c, and the resource 706c is for is for transmission from the UE 715b to the UE 715c. Alternatively, the BS may indicate that every other reserved resource is for transmission from the UE 715a to the UE 715b. In some aspects, the BS may determine the resource usage pattern based on traffic pattern or traffic needs at the UEs 715a, 715b, and/or 715c known by the BS or predicted by the BS. In some aspects, the BS may indicate the reserved resources and/or the resource usage pattern to the UE 715a, 715b, and/or 715c via RRC configurations.

The scheme 700 assumes that the UE 715c may detect and decode the SCI A 712 transmitted by the UE 715a and thus may be aware of the reservation of the resource 706c for the sidelink data B2 from the UE 715b. However, in some instances, the UE 715c may be able to detect and decode transmission from the UE 715b, but may not be able to detect and/or decode transmission from the UE 715c. Accordingly, in some aspects, the UE 715b may repeat at least some of the reservation information received from the SCI A 712 to facilitate channel sensing and/or detection at the UE 715c as discussed below.

Figure 8A:
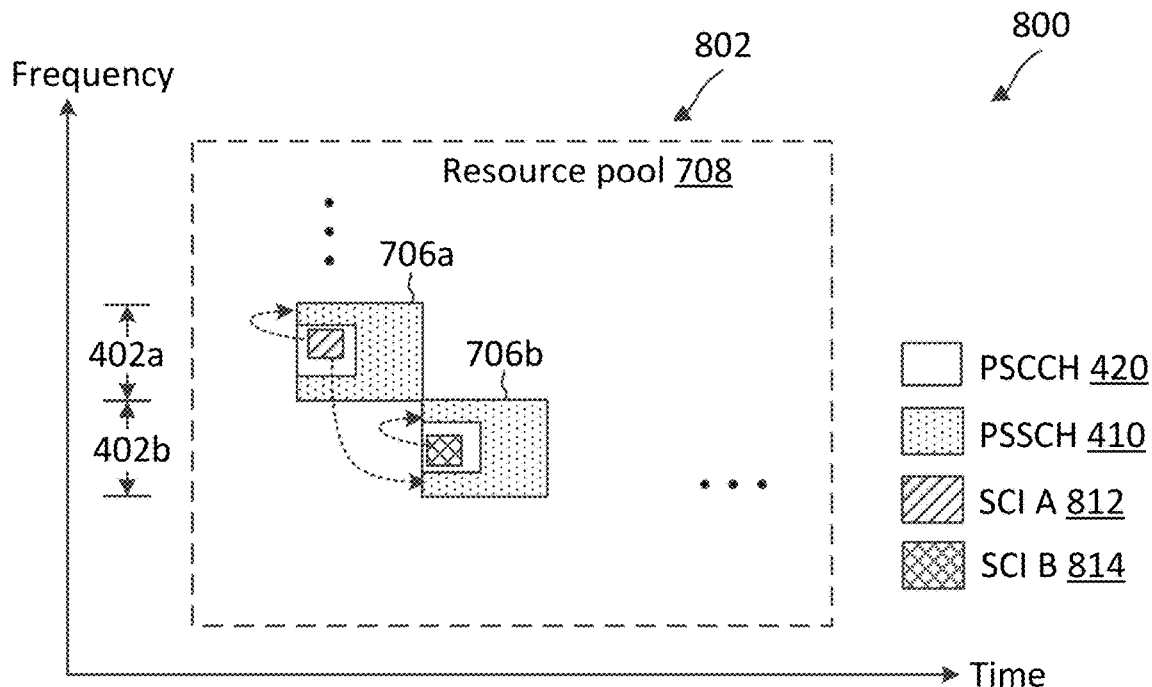
FIG. 8A illustrates a sidelink resource reservation for multiple sidelinks according to some aspects of the present disclosure.

FIG. 8A will be discussed in relation to FIG. 8B to illustrate a sidelink communication scheme 800. The scheme 800 may be employed by UEs such as the UEs 115, 315, and/or 500 in a network such as the networks 100 and 300. In particular, a sidelink transmitting UE may reserve multiple sidelink resources for its own transmission and for transmissions by one or more other UEs over a sequence of one or more other sidelinks (e.g., the sidelinks 351, 352, and/or 354) and a peer UE may repeat the indication of at least some of the reservations as shown in the scheme 800. The scheme 800 is discussed using a similar sidelink communication scenario among sidelink UEs 715a, 715b, and 715c as in FIG. 7B.

FIG. 8A illustrates a resource reservation 802 for multiple sidelinks according to some aspects of the present disclosure. In FIG. 8A, the x-axis represents time in some arbitrary units, and the y-axis represents frequency in some arbitrary units. In general, time resources include one or more symbols (which can be grouped in slots or mini-slots), and frequency resources include one or more subcarriers (which can be grouped in subbands or subchannels). The resource reservation 802 is described using the same resource pool structure as in FIG. 7A, and may use the same reference numerals as in FIG. 7A for simplicity's sake. FIG. 8B is a signaling diagram illustrating a sidelink communication method 804 according to some aspects of the present disclosure. The method 804 may be implemented among the sidelink UEs 715a, 715b, and 715c. As illustrated, the method 804 includes a number of enumerated steps, but embodiments of the method 804 may include additional steps before, after, and in between the enumerated steps. In some aspects, one or more of the enumerated steps may be omitted or performed in a different order.

Figure 8B:
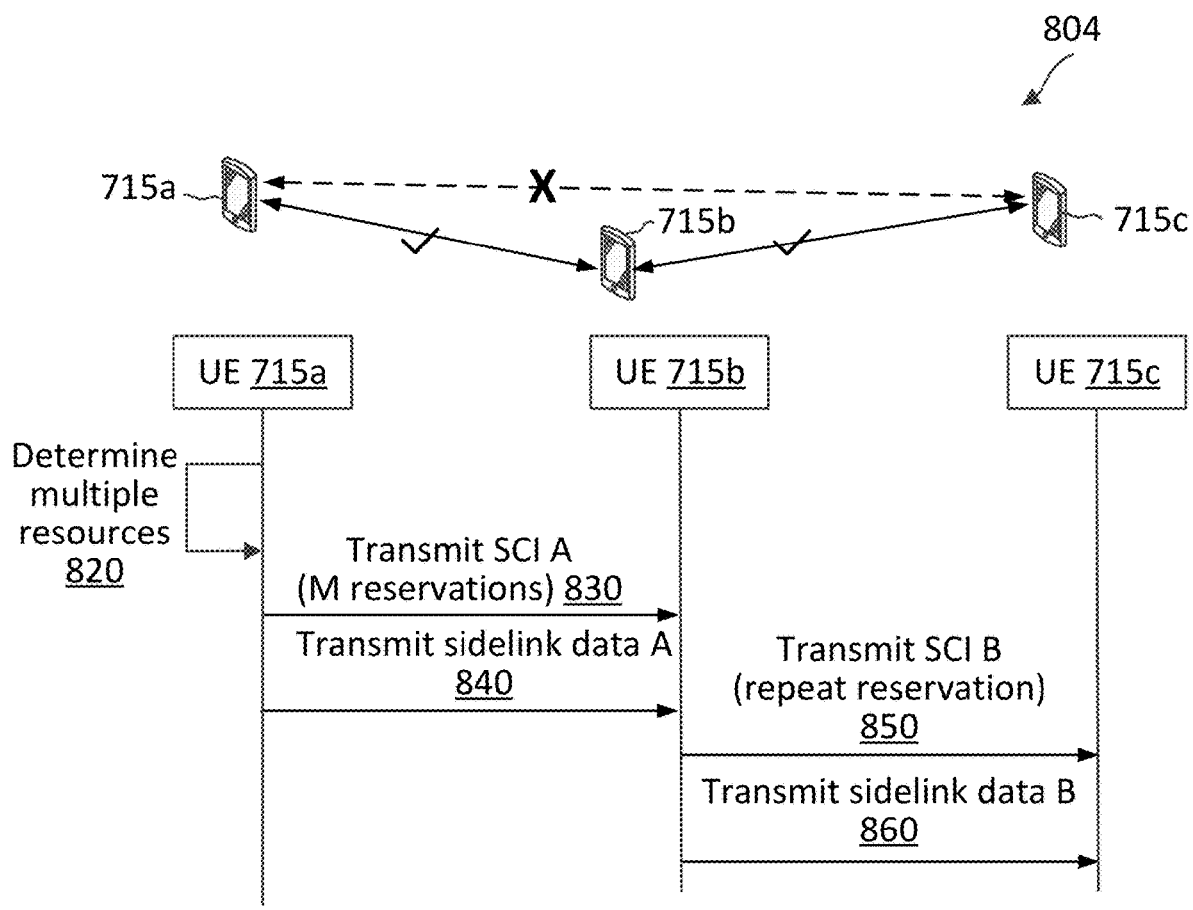
FIG. 8B is a signaling diagram illustrating a sidelink communication method according to some aspects of the present disclosure.

In the illustrated example of FIG. 8B, the UE 715a and the UE 715b can detect each other's transmissions as shown by the checkmark. The UE 715b and the UE 715c can detect each other's transmissions as shown by the checkmark. However, the UE 715c and the UE 715a may not detect each other's transmissions as shown by the cross symbol. Accordingly, in the method 804, the UE 715b may transmit SCI repeating a resource reservation to be used for sidelink transmission to the UE 715c.

Generally speaking, the method 804 includes features similar to the method 704 in many respects. For example, steps 720, 730, 740, and 760 are similar to steps 820, 830, 840, and 860, respectively. Accordingly, for sake of brevity, details of those steps will not be repeated here.

At step 820, the UE 715a determines multiple sidelink resources for transmission to the UE 715b and for the UE 715b to transmit to the UE 715c. For instance, the UE 715a reserves the resource 706a for transmission from the UE 715a to the UE 715b and the resource 706b for transmission from the UE 715b to the UE 715c as shown in FIG. 8A.

At step 830, the UE 715a transmits SCI A (shown as SCI A 812 in FIG. 8A) indicating the reservations for the resources 706a and 706b (e.g., M=2).

At step 840, the UE 715a transmits sidelink data A to the UE 715b in the PSSCH 410 of resource 706a.

At step 850, the UE 715b transmits SCI B repeating the reservation for the resource 706b, which may be subsequently used for transmission to the UE 715c. The UE 715a may transmit SCI B as shown in FIG. 8A, where the SCI B is shown as SCI B 814 carried in a PSCCH 420 of the resource 706b and indicating the reserved resource 706b as shown by the dotted arrow. In some aspects, the UE 715b may echo or duplicate all the reservations indicated by the SCI A 812 received from the UE 715a. In other words, the SCI B 814 may indicate the reservations for the resources 706a and the resource 706b. The repeated transmission or indication of the reservation for the resource 706b by the UE 715b enables the UE 715c to detect the reservation, that may otherwise be missed by the UE 715c. In some instances, the UE 715b may utilize one or more components, such as the processor 502, the sidelink communication module 508, the transceiver 510, the modem 512, and the one or more antennas 516, to generate SCI B 814 by including the reservation for the resource 706b indicated by the SCI A 812 and transmit the SCI B 812 to the UE 715c.

In some aspects, the SCI B 814 may be a first stage SCI of a two-staged SCI. The UE 715b may transmit a second stage SCI in the PSSCH 410 of the resource 706b to indicate scheduling information (e.g., MCS) to be used for sidelink data transmission in the resource 706b.

At step 860, the UE 715b transmits sidelink data B to the UE 715c in the PSSCH 410 of resource 706b according to the scheduling information. For instance, the UE 715c may utilize one or more components, such as the processor 502, the sidelink communication module 508, the transceiver 510, the modem 512, and the one or more antennas 516, to receive the SCI B 814, perform blind decoding to recover sidelink resource reservation information carried by SCI B 814, receive the sidelink data B in the resource 706b based on the resource reservation information.

Figure 9A:
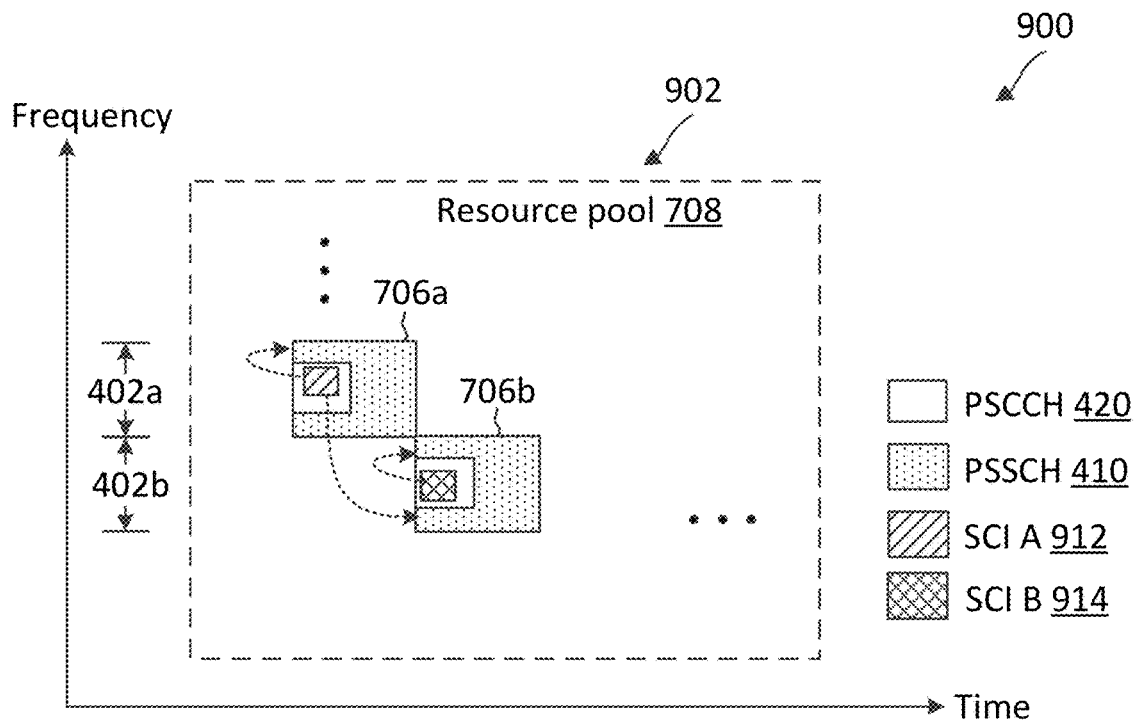
FIG. 9A illustrates a sidelink resource reservation for multiple sidelinks according to some aspects of the present disclosure.
Figure 9B:
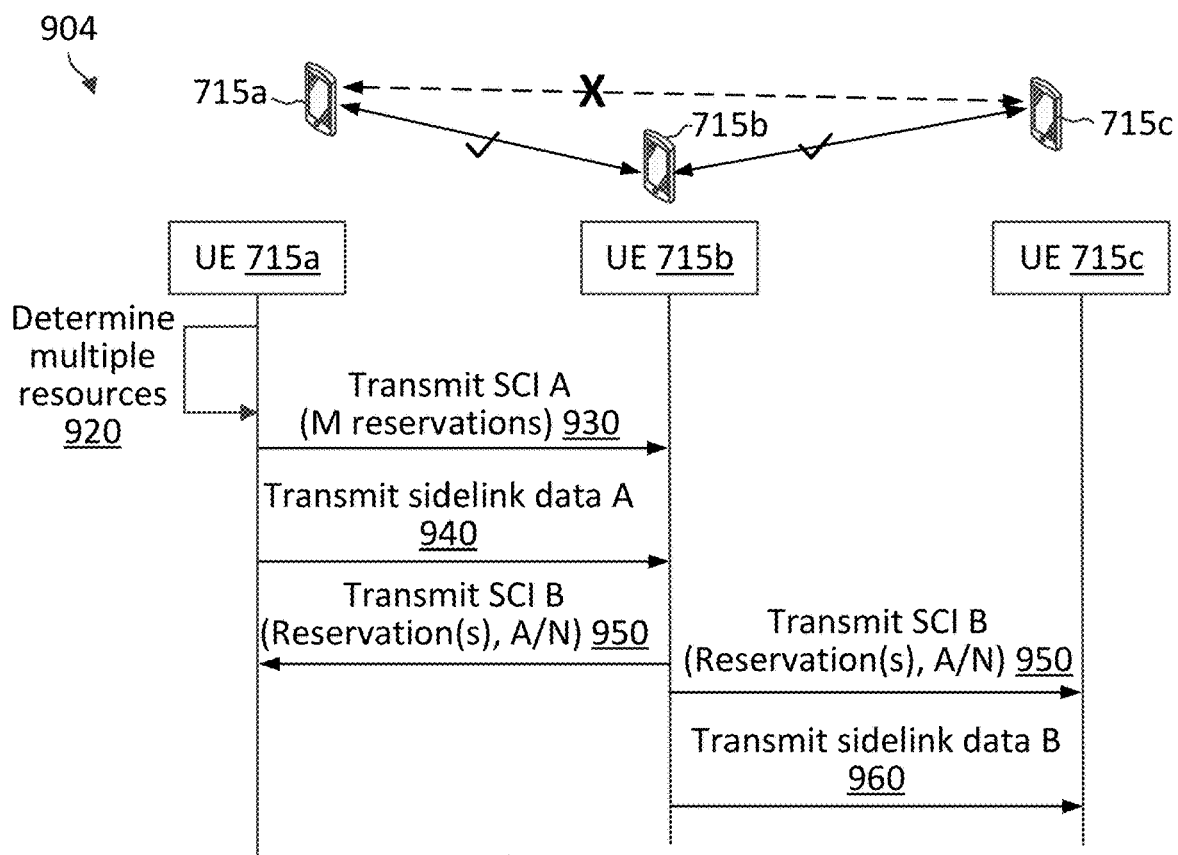
FIG. 9B is a signaling diagram illustrating a sidelink communication method according to some aspects of the present disclosure.

FIG. 9A will be discussed in relation to FIG. 9B to illustrate a sidelink communication scheme 900. The scheme 900 may be employed by UEs such as the UEs 115, 315, and/or 500 in a network such as the networks 100 and 300. In particular, a sidelink transmitting UE may reserve multiple sidelink resources for its own transmission and for transmissions by one or more other UEs over one or more other sidelinks (e.g., the sidelinks 351, 352, and/or 354) and may additionally reserve resources for sidelink feedbacks (e.g., HARQ AKC/NACK) as shown in the scheme 900. The scheme 900 is discussed using a similar sidelink communication scenario among sidelink UEs 715a, 715b, and 715c as in FIG. 7B.

FIG. 9A illustrates a resource reservation 902 for multiple sidelinks according to some aspects of the present disclosure. In FIG. 9A, the x-axis represents time in some arbitrary units, and the y-axis represents frequency in some arbitrary units. In general, time resources include one or more symbols (which can be grouped in slots or mini-slots), and frequency resources include one or more subcarriers (which can be grouped in subbands or subchannels). The resource reservation 902 is similar to the resource reservation 802 in FIG. 8A. FIG. 9B is a signaling diagram illustrating a sidelink communication method 904 according to some aspects of the present disclosure. The method 904 may be implemented among the sidelink UEs 715a, 715b, and 715c. As illustrated, the method 904 includes a number of enumerated steps, but embodiments of the method 904 may include additional steps before, after, and in between the enumerated steps. In some aspects, one or more of the enumerated steps may be omitted or performed in a different order.

Generally speaking, the method 904 includes features similar to the method 804 in many respects. For example, steps 920, 930, 940, and 960 are similar to steps 820, 830, 840, and 860, respectively. Accordingly, for sake of brevity, details of those steps will not be repeated here. Please refer to the corresponding descriptions above. However, the method 904 allows an HARQ ACK/NACK to be included in an SCI transmission.

In this regard, at step 930, the UE 715a transmits SCI A (shown as SCI A 912 in FIG. 9A). The SCI A 912 may indicate the reservations for the resources 706a and 706b and may additionally indicate a PSFCH reservation for the UE 715b to feedback a HARQ ACK/NACK for a subsequent sidelink data A transmission from the UE 715 at step 940. In this regard, the SCI A 912 may indicate that the HARQ ACK/NACK may be carried by SCI in the resource 706b.

At step 950, upon receiving the SCI A 912 and the sidelink data A from the UE 715a, the UE 715b transmits SCI B (shown as SCI B 914 in FIG. 9A) in the PSCCH 420 of the resource 706b. In some aspects, the SCI B 914 may be a first stage SCI of a two-staged SCI. The SCI B 914 may be received by the UE 715a and the UE 715c as shown by the arrows to the UE 715a and UE 715c, respectively. The SCI B 914 may indicate a HARQ ACK/NACK for the sidelink data A in addition to repeating the reservation for the resource 706b for a subsequent sidelink transmission to the UE 715c. In this regard, the UE 715b may generate a HARQ ACK if the sidelink data A is received and decoded successfully. Alternatively, the UE 715b may generate a HARQ NACK if the UE 715b fails to decode the sidelink data A. In some instances, the HARQ ACK/NACK may be a single bit indicating a 1 for ACK or a 0 for NACK. In some other instances, the HARQ ACK/NACK may be a sequence selected from a HARQ ACK/NACK codebook. In some instances, the UE 715b may utilize one or more components, such as the processor 502, the sidelink communication module 508, the transceiver 510, the modem 512, and the one or more antennas 516, to generate a HARQ ACK/NACK for the sidelink data A and generate the SCI B 914 based on the HARQ ACK/NACK and the reservation for the resource 706b.

At step 960, the UE 715b transmits sidelink data B to the UE 715c in the PSSCH 410 of resource 706b.

In some aspects, if the SCI B 914 indicates an NACK, the UE 715a may subsequently reserve another resource for a retransmission of the sidelink data A. Conversely, if the SCI B 914 indicates an ACK, the UE 715a may subsequently reserve a resource for a new transmission (e.g., a new TB).

Figure 10A:
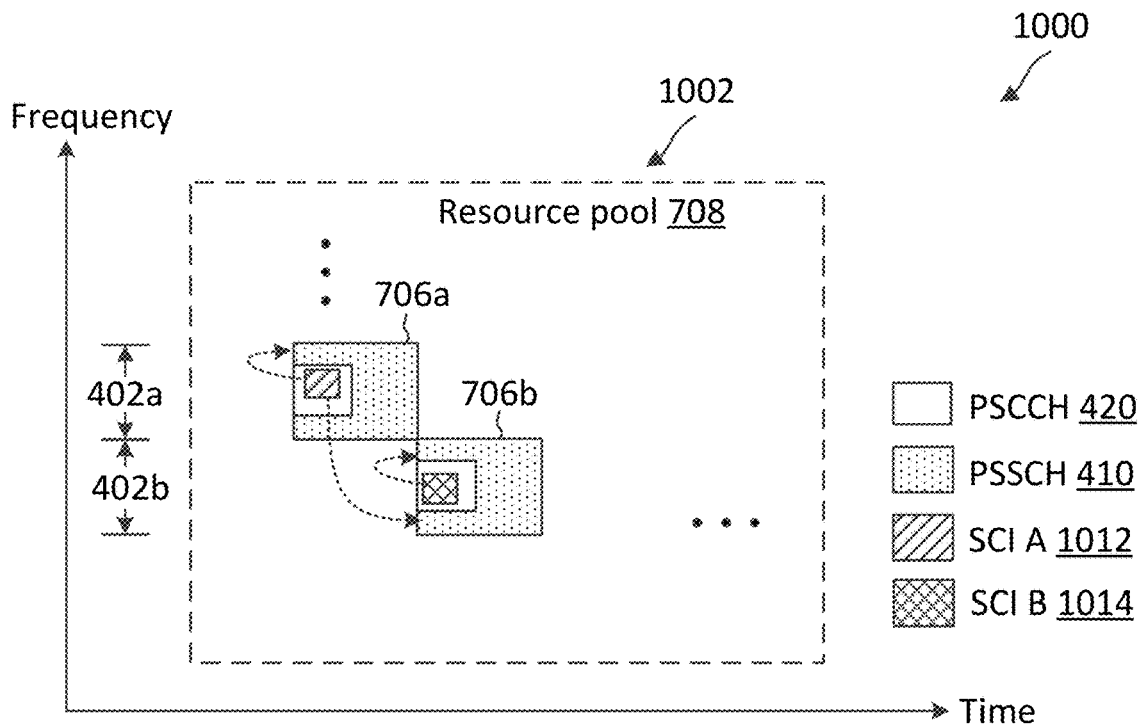
FIG. 10A illustrates a sidelink resource reservation for multiple sidelinks according to some aspects of the present disclosure.
Figure 10B:
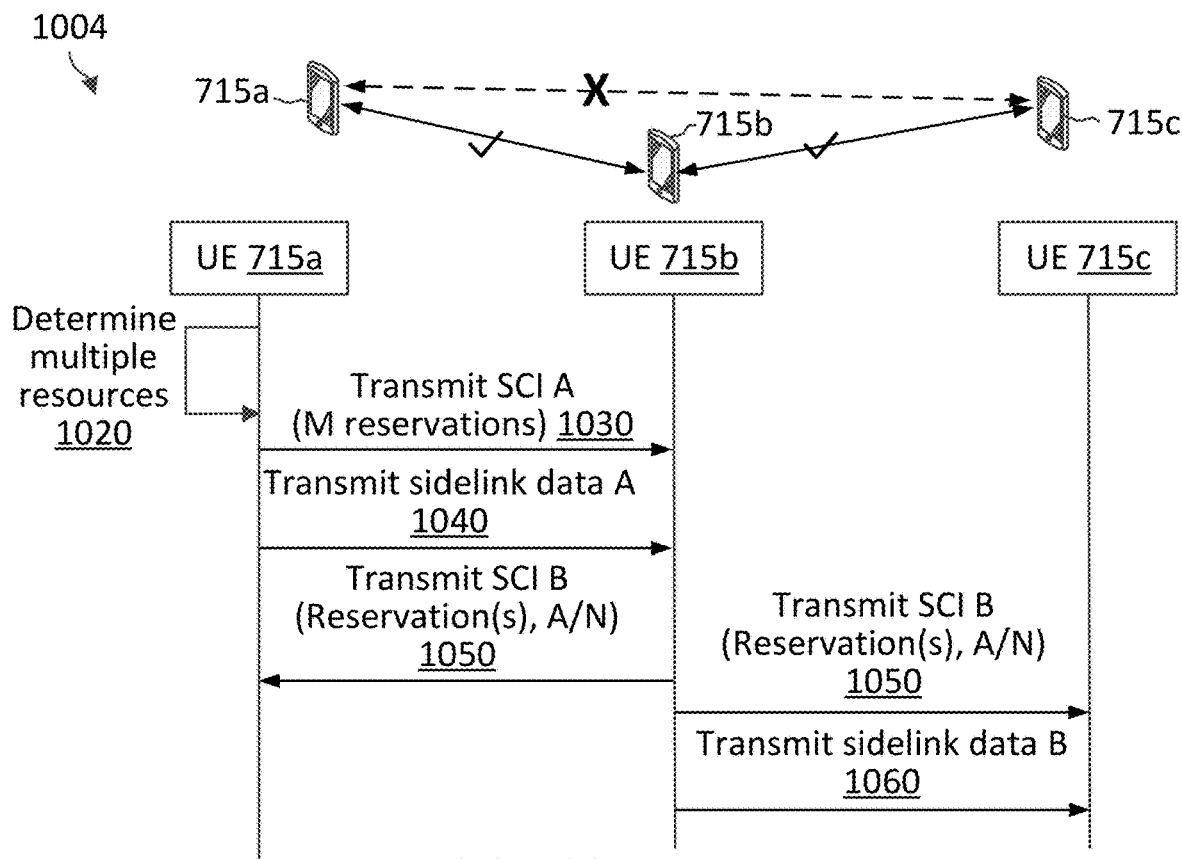
FIG. 10B is a signaling diagram illustrating a sidelink communication method according to some aspects of the present disclosure.

FIG. 10A will be discussed in relation to FIG. 10B to illustrate a sidelink communication scheme 1000. The scheme 1000 may be employed by UEs such as the UEs 115, 315, and/or 500 in a network such as the networks 100 and 300. In particular, a sidelink transmitting UE may reserve multiple sidelink resources for its own transmission and for transmissions by one or more other UEs over one or more other sidelinks (e.g., the sidelinks 351, 352, and/or 354) and may additionally reserve resources for sidelink SRs as shown in the scheme 1000. The scheme 1000 is discussed using a similar sidelink communication scenario among sidelink UEs 715a, 715b, and 715c as in FIG. 7B.

FIG. 10A illustrates a resource reservation 1002 for multiple sidelinks according to some aspects of the present disclosure. In FIG. 10A, the x-axis represents time in some arbitrary units, and the y-axis represents frequency in some arbitrary units. In general, time resources include one or more symbols (which can be grouped in slots or mini-slots), and frequency resources include one or more subcarriers (which can be grouped in subbands or subchannels). The resource reservation 1002 is similar to the resource reservation 802 and 902. FIG. 10B is a signaling diagram illustrating a sidelink communication method 1004 according to some aspects of the present disclosure. The method 1004 may be implemented among the sidelink UEs 715a, 715b, and 715c. As illustrated, the method 1004 includes a number of enumerated steps, but embodiments of the method 1004 may include additional steps before, after, and in between the enumerated steps. In some aspects, one or more of the enumerated steps may be omitted or performed in a different order.

Generally speaking, the method 1004 includes features similar to the method 804 in many respects. For example, steps 1020, 1030, 1040, and 1060 are similar to steps 820, 830, 840, and 830, respectively. Accordingly, for sake of brevity, details of those steps will not be repeated here. Please refer to the corresponding descriptions above. However, the method 1004 allows an SR to be included in an SCI transmission.

In this regard, at step 1030, the UE 715a transmits SCI A (shown as SCI A 1012 in FIG. 10A). The SCI A 1012 may indicate the reservations for the resources 706a and 706b and may additionally indicate a reservation for the UE 715b to transmit an SR or BSR. In this regard, the SCI A 912 may indicate that the SR or BSR may be carried by SCI in the resource 706b.

At step 1050, upon receiving the SCI A 1012, the UE 715b transmits SCI B (shown as SCI B 1014 in FIG. 10A) in the PSCCH 420 of the resource 706b. In some aspects, the SCI B 1014 may be a first stage SCI of a two-staged SCI. The SCI B 1014 may be received by the UE 715a and the UE 715c as shown by the arrows to the UE 715a and UE 715c, respectively. The SCI B 1014 may indicate an SR or a BSR in addition to repeating the reservation for the resource 706b for a subsequent sidelink transmission to the UE 715c. In this regard, the UE 715b may determine that the resource 706b may not be sufficient for carrying all sidelink data to the UE 715c, and thus the UE 715b may indicate an SR in the SCI B 1014. Additionally or alternatively, the UE 715b may determine that there is data ready for transmission to the UE 715a, and thus may indicate an SR or a BSR in the SCI B 1014. In some instances, the SCI B 1014 may indicate an SR for each sidelink using a single bit, where a bit value of 1 may indicate an SR is enabled (e.g., requesting for resource) and a bit value of 0 may indicate an SR is disabled (e.g., no request for resource). In some instances, the SCI B 1014 may indicate a BSR for each sidelink, where the BSR may indicate an amount of data ready for transmission. In some instances, the UE 715b may utilize one or more components, such as the processor 502, the sidelink communication module 508, the transceiver 510, the modem 512, and the one or more antennas 516, to generate one or more SRs or BSRs based on whether there is additional data ready for transmission to the UE 715a and/or the UE 715c and generate the SCI B 1014 based on the SRs or BSRs and the reservation for the resource 706b.

At step 1060, the UE 715b transmits sidelink data B to the UE 715c in the PSSCH 410 of resource 706b.

In some aspects, the SCI B 1014 may include an SR or a BSR indicating there is no data for transmission in the resource 706b, and thus the resource 706b may return to the UE 715a.

Figure 11A:
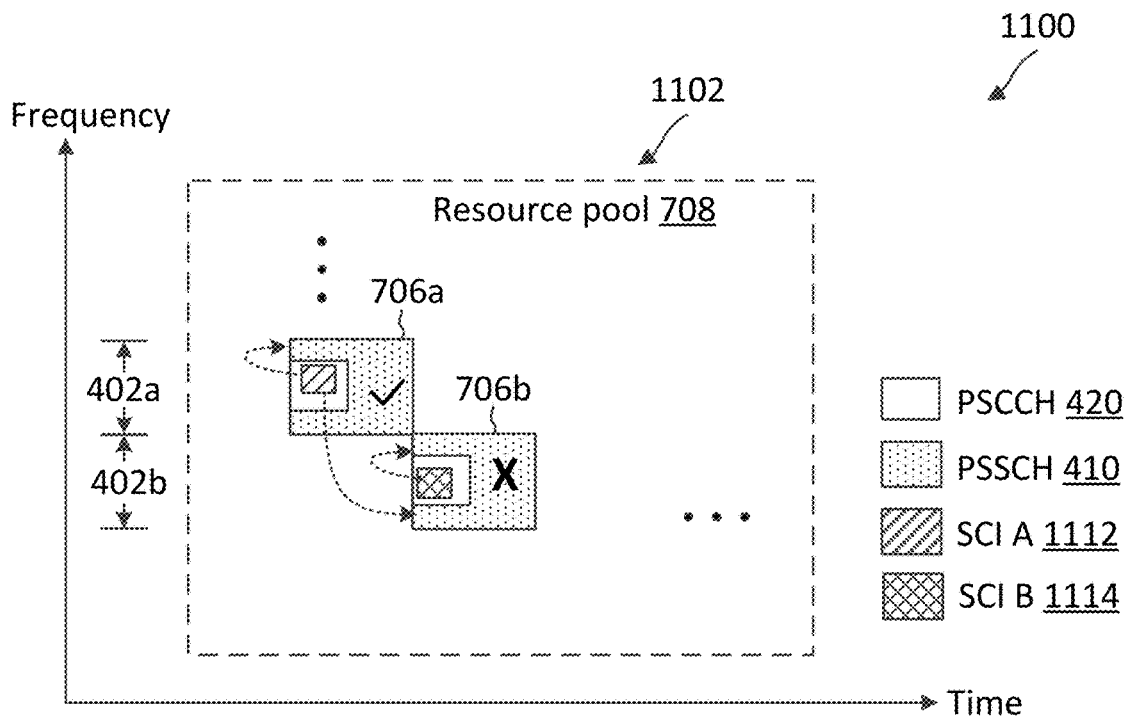
FIG. 11A illustrates a sidelink resource reservation for multiple sidelinks according to some aspects of the present disclosure.

FIG. 11A will be discussed in relation to FIG. 11B to illustrate a sidelink communication scheme 1100. The scheme 1100 may be employed by UEs such as the UEs 115, 315, and/or 500 in a network such as the networks 100 and 300. In particular, a sidelink transmitting UE may reserve multiple sidelink resources for its own transmission and for transmissions by one or more other UEs over one or more other sidelinks (e.g., the sidelinks 351, 352, and/or 354) and may additionally indicate a release of a reserved resource as shown in the scheme 1100. The scheme 1100 is discussed using a similar sidelink communication scenario among sidelink UEs 715a, 715b, and 715c as in FIG. 7B.

FIG. 11A illustrates a resource reservation 1102 for multiple sidelinks according to some aspects of the present disclosure. In FIG. 11A, the x-axis represents time in some arbitrary units, and the y-axis represents frequency in some arbitrary units. In general, time resources include one or more symbols (which can be grouped in slots or mini-slots), and frequency resources include one or more subcarriers (which can be grouped in subbands or subchannels). The resource reservation 1102 is similar to the resource reservation 802 in FIG. 8A. FIG. 11B is a signaling diagram illustrating a sidelink communication method 1004 according to some aspects of the present disclosure. The method 1104 may be implemented among the sidelink UEs 715a, 715b, and 715c. As illustrated, the method 1104 includes a number of enumerated steps, but embodiments of the method 1104 may include additional steps before, after, and in between the enumerated steps. In some aspects, one or more of the enumerated steps may be omitted or performed in a different order.

Generally speaking, the method 1104 includes features similar to the method 804 in many respects. For example, steps 1120, 1130, and 1140 are similar to steps 820, 830, and 840, respectively. Accordingly, for sake of brevity, details of those steps will not be repeated here. Please refer to the corresponding descriptions above. However, the method 1104 additionally illustrate techniques for releasing a reserved sidelink resource and/or reclaiming a released sidelink resource.

In this regard, at step 1130, the UE 715a transmits SCI A (shown as SCI A 1112 in FIG. 11A). Similar to the SCI A 812, the SCI A 1112 may indicate that the resource 706a is reserved for transmission from the UE 715a to the UE 715b and the resource 706b is reserved for transmission from the UE 715b to the UE 715c. In some aspects, the SCI A 1112 may also indicate whether the UE 715b may release the resource 706b if the UE 715b has no data for transmission.

At step 1150, upon receiving the SCI A, the UE 715b transmits SCI B (shown as SCI B 1114 in FIG. 10A) in the PSCCH 420 of the resource 706b to indicate a release of the resource 706b reserved for the UE 715b. In this regard, the UE 715b may determine that there is no data ready for transmission to the UE 715c, and thus may release the reserved resource 706b. In some instances, the SCI B 1114 may indicate the release of the reserved resource 706b by using a single bit, where a bit value of 0 may indicate that the resource 706b is released and a bit value of 1 may indicate that the resource 706b is not released. In some instances, the UE 715b may utilize one or more components, such as the processor 502, the sidelink communication module 508, the transceiver 510, the modem 512, and the one or more antennas 516, to transmit SCI B 1114 including a bit indicating that the reserved resource 706 is released. In some aspects, the SCI B 1114 may be a first stage SCI of a two-staged SCI.

At step 1160, upon detecting that the reserved resource 706b is released, the UE 715c transmit sidelink data C to the UE 715b or any other sidelink UE using the released resource 706b. For instance, the UE 715c may utilize one or more components, such as the processor 502, the sidelink communication module 508, the transceiver 510, the modem 512, and the one or more antennas 516, to monitor for SCI in the PSCCH 420 of the resource 706b, detect the SCI B 1114 from the monitoring, determine that the SCI B 1114 indicating the released resource 706b, and transmit the sidelink data C using the released resource 706b.

In some other instances, at step 1150, the SCI B 1114 may indicate all released resources. For instance, the UE 715a may have reserved two resources 706 for transmission to the UE 715b, but may use only one of the reserved resources 706 and release the other resource 706. Thus, the UE 715b may indicate the resource 706 released by the UE 715a and the UE 715b. In general, a transmitting $UE_1$ may reserve resources sequentially for K number of UEs, denoted as $UE_{1+1}$ to $UE_{i+K}$, where K may be 2, 3 or more. For instance, the $UE_1$ reserves a resource for a $UE_{i+1}$ to transmit to a $UE_{i+2}$, a resource for a $UE_{i+2}$ to transmit to a $UE_{i+3}$, and so on. A $UE_j$, where j is between 1 and K, may indicate resource(s) released by the $UE_j$ or resource(s) released by all UEs from $UE_i$ 1 to $UE_{j-1}$. The released resource(s) may be reclaimed by any UE detecting an indication of the released resource.

FIG. 12A will be discussed in relation to FIG. 12B to illustrate a sidelink communication scheme 1200. The scheme 1200 may be employed by UEs such as the UEs 115, 315, and/or 500 in a network such as the networks 100 and 300. In particular, a sidelink UE may reclaim a reserved resource for sidelink communication as shown in the scheme 1200.

FIG. 12A illustrates a sidelink communication scenario 1202 according to some aspects of the present disclosure. As shown, the scenario 1202 includes sidelink UEs 1215a, 1215b, and 1215c. The sidelink UEs 1215 may be similar to the UEs 115, 315, 500, and/or 715. The sidelink UE 1215a may be correspond to the transmitting UE 715a that reserves multiple resources (e.g., the resources 406 and/or 706) for multiple sidelinks as shown in the schemes 700, 800, 900, 1000, and/or 1100 discussed above with respect to FIGS. 7, 8, 9, 10, and/or 11, respectively. For instance, the UE 1215a may reserve two resources, a resource A (e.g., the resource 706a) for transmission by the UE 1215a and a resource B (e.g., the resource 706b) for transmission by the UE 1215b. In the illustrated example of FIG. 12A, the UE 1215c may detect a transmission from the UE 1215a as shown by the checkmark, but may not detect a transmission from the UE 1215b as shown by the cross symbol.

FIG. 12B is a flow diagram of a sidelink communication method 1204 according to some aspects of the present disclosure. Aspects of the method 1204 can be implemented by the UE 1215c. For example, the UE 1215c may utilize one or more components, such as the processor 502, the memory 504, the sidelink communication module 508, the transceiver 510, the modem 512, and the one or more antennas 516, to execute the steps of method 1204. As illustrated, the method 1204 includes a number of enumerated steps, but aspects of the method 1204 may include additional steps before, after, and in between the enumerated steps. In some aspects, one or more of the enumerated steps may be omitted or performed in a different order.

At block 1220, the UE 1215*c* determines whether SCI (e.g., the SCIs 712, 812, 814. 912, 914, 1012, 1014, 1112, and/or 1114) indicating a transmission in the reserved resource B is detected from the UE 1215*a* and/or the UE 1215*b*. For instance, the UE 1215*a* may transmit SCI in the PSCCH (e.g., the PSCCH 420) of the resource A to indicate a reservation for the resource A and the resource B and the UE 1215*b* may transmit SCI in the PSCCH of the resource B to indicate the reservation for the resource B as discussed above in the schemes 800, 900, and 1000. Thus, the UE 1215*c* may utilize one or more components, such as the processor 502, the sidelink communication module 508, the transceiver 510, the modem 512, and the one or more antennas 516, to monitor for SCI in the PSCCH of the resource A and the resource B, determine whether SCI indicating a transmission in the resource B is detected in the PSCCH of the resource A or the resource B.

If the UE 1215*c* detects SCI indicating a transmission in the reserved resource B is detected from the UE 1215*a* or the UE 1215*b*, the UE 1215*c* proceeds to block 1240. At block 1240, the UE 1215*c* refrains from transmitting in the resource in response to detecting SCI indicating a transmission in the reserved resource B. Thus, the UE 1215*c* may not transmit in the resource B as long as the UE 1215*c* detects SCI indicating a transmission in the resource B irrespective of whether the detected SCI is from UE 1215*a* (reserving the resource B) or UE 1215*b* (assigned with the reserved resource B). Accordingly, in the scenario 1202, the UE 1215*c* may not reclaim the resource B for transmission.

If the UE 1215*c* does not detect any SCI from the UE 1215*a* and/or the UE 1215*b* indicating a transmission in the reserved resource B, the UE 1215*c* proceeds to block 1230. At block 1230, the UE 1215*c* reclaims the released resource B for transmission. Thus, the UE 1215*c* may utilize one or more components, such as the processor 502, the sidelink communication module 508, the transceiver 510, the modem 512, and the one or more antennas 516, to transmit sidelink data using the resource B.

FIG. 13A will be discussed in relation to FIG. 13B to illustrate a sidelink communication scheme 1300. The scheme 1300 may be employed by UEs such as the UEs 115, 315, and/or 500 in a network such as the networks 100 and 300. In particular, a sidelink UE may reclaim a reserved resource for sidelink communication as shown in the scheme 1300.

FIG. 13A illustrates a sidelink communication scenario 1302 according to some aspects of the present disclosure. The scenario 1302 is similar to the scenario 1202 shown in FIG. 12. For instance, the UE 1215*a* may reserve two resources, a resource A (e.g., the resource 706*a*) for transmission by the UE 1215*a* and a resource B (e.g., the resource 706*b*) for transmission by the UE 1215*b*.

FIG. 13B is a flow diagram of a sidelink communication method 1304 according to some aspects of the present disclosure. Aspects of the method 1304 can be implemented by the UE 1215*c*. For example, the UE 1215*c* may utilize one or more components, such as the processor 502, the memory 504, the sidelink communication module 508, the transceiver 510, the modem 512, and the one or more antennas 516, to execute the steps of method 1204. As illustrated, the method 1304 includes a number of enumerated steps, but aspects of the method 1304 may include additional steps before, after, and in between the enumerated steps. In some aspects, one or more of the enumerated steps may be omitted or performed in a different order.

At block 1320, the UE 1215*c* detects SCI (e.g., the SCIs 712, 812, 814. 912, 914, 1012, 1014, 1112, and/or 1114) from UE 1215*a* reserving the resource B, for example, using similar mechanisms as described in block 1220.

At block 1330, the UE 1215 determines whether SCI indicating a transmission in the reserved resource B is detected from the UE 1215*b*, for example, using similar mechanisms as described in block 1220.

If the UE 1215*c* detects SCI indicating a transmission in the reserved resource B is detected from the UE 1215*b*, the UE 1215*c* proceeds to block 1340. At block 1240, the UE 1215*c* refrains from transmitting in the resource in response to detecting SCI indicating a transmission in the reserved resource B.

If the UE 1215*c* does not detect any SCI from the UE 1215*b* a transmission in the reserved resource B, the UE 1215*c* proceeds to block 1330. At block 1330, the UE 1215*c* reclaims the released resource B for transmission. For instance, the UE 1215*c* transmits sidelink data in the reclaimed resource B.

As can be observed, the method 1300 differs from the method 1200 by allowing the UE 1215*c* to reclaim the reserved resource B for transmission if the UE 1215*c* does not detect SCI from the UE 1215*b* assigned to the reserved resource. In other words, if the UE 1215*c* cannot detect a transmission from the assigned UE 1215*b*, the UE 1215*c*'s transmission may not interfere with the UE 1215*b*'s transmission. Thus, the UE 1215*c* may reclaim the reserved resource B based on a spatial reuse of the reserved resource B.

Figure 14:
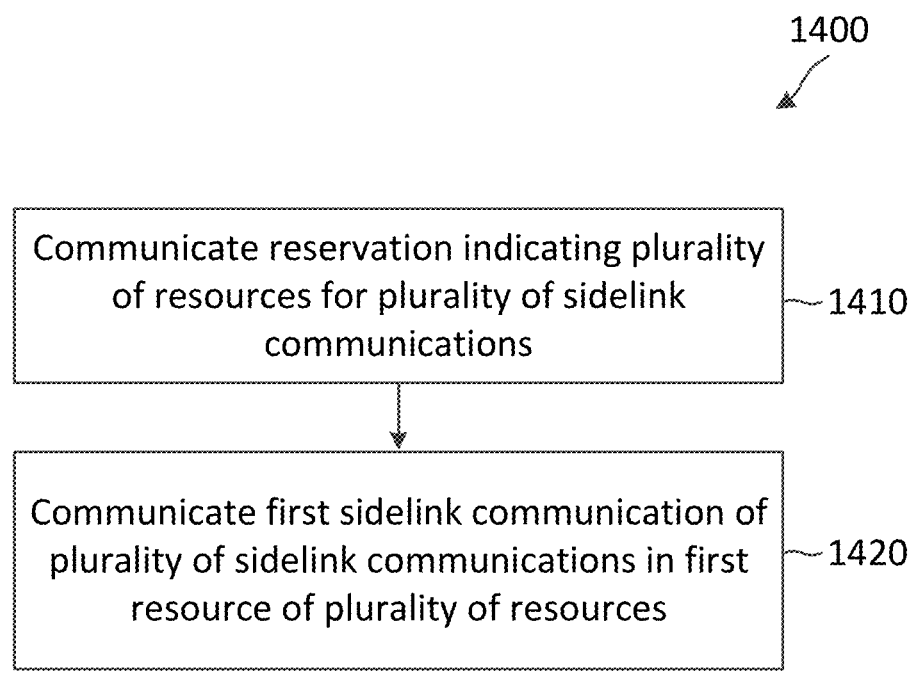
FIG. 14 is a flow diagram of a sidelink communication method according to some aspects of the present disclosure.

FIG. 14 is a flow diagram of a sidelink communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UE 115, 315, 500, 715, and/or 1215 may utilize one or more components, such as the processor 502, the memory 504, the sidelink communication module 508, the transceiver 510, the modem 512, and the one or more antennas 516, to execute the steps of method 1400. The method 1400 may employ similar mechanisms as in the schemes 700, 800, 900, 1000, 1100, 1200, and/or 1300 discussed above with respect to FIGS. 7A-7B, 8A-8B, 9A-9B, 10A-10B, 11A-11B, 12A-12B, and/or 13A-13B, respectively. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first wireless communication device communicates, with a second wireless communication device, a reservation indicating a plurality of resources (e.g., the sidelink resources 406 and/or 706) for a plurality of sidelink communications (e.g., sidelink data). The plurality of resources reserved for the plurality of sidelink communications are sidelink resources (each including one or more resource elements) as discussed above with reference to FIGS. 4A-4D, 7A-7B, 8A-8B, 9A-9B, 10A-10B, 11A-11B, 12A-12B, and/or 13A-13B. In some instances, the first wireless communication device may utilize one or more components, such as the processor 502, the sidelink communication module 508, the transceiver 510, the modem 512, and the one or more antennas 516, to communicate the reservation indicating the plurality of resource for the plurality of sidelink communications.

In some aspects, the reservation indicates the plurality of resources in a plurality of subchannels (e.g., the subbands 402a, 402b, 402c). In some aspects, the reservation indicates an assignment of a first resource (e.g., one or more resource elements) to the first sidelink communication and an assignment of a second resource (e.g., one or more resource elements) of the plurality of resources to a second sidelink communication of the plurality of sidelink communications.

At block 1420, the first wireless communication device communicates, with a third wireless communication device, a first sidelink communication of the plurality of sidelink communications using the first resource of the plurality of resources. In some instances, the first wireless communication device may utilize one or more components, such as the processor 502, the sidelink communication module 508, the transceiver 510, the modem 512, and the one or more antennas 516, to communicating the first sidelink communication.

In some aspects, the first wireless communication device may correspond to the transmitting UE 715a or the UE 1215a reserving the plurality of resources and the second wireless communication device may correspond to the UE 715b, 715c, 1215b, or 1215c. Accordingly, the first wireless communication may select the plurality resources, for example, from a resource pool as discussed above in scheme 700, and transmit the reservation to the second wireless communication device. In some aspects, the first wireless communication may transmit SCI (e.g., the SCI 712, 812, 912, 1012, and/or 1112) indicating the reservation.

In some aspects, the second wireless communication device may correspond to the transmitting UE 715a or the UE 1215a reserving the plurality of resources and the first wireless communication device may correspond to the UE 715b, 715c, 1215b, or 1215c. Accordingly, the first wireless communication may receive the reservation from the second wireless communication device. In some aspects, the block 1420 may include transmitting, by the first wireless communication device to the third wireless communication device, the first sidelink communication in the first resource. In some aspects, the third wireless communication device corresponds to the second wireless communication device. In some aspects, the third wireless communication device is different than the second wireless communication device. In some aspects, the first wireless communication device may further transmit, second SCI indicating at least the first resource indicated by the first SCI, for example, as discussed in the schemes 800 with reference to FIGS. 8A-8B. In some aspects, the second SCI may indicate an HARQ ACK/NACK as discussed in the scheme 900 with reference to FIGS. 9A-9B. In some aspects, the second SCI may indicate an SR or a BSR as discussed in the scheme 1000 with reference to FIGS. 10A-10B.

Figure 11B:
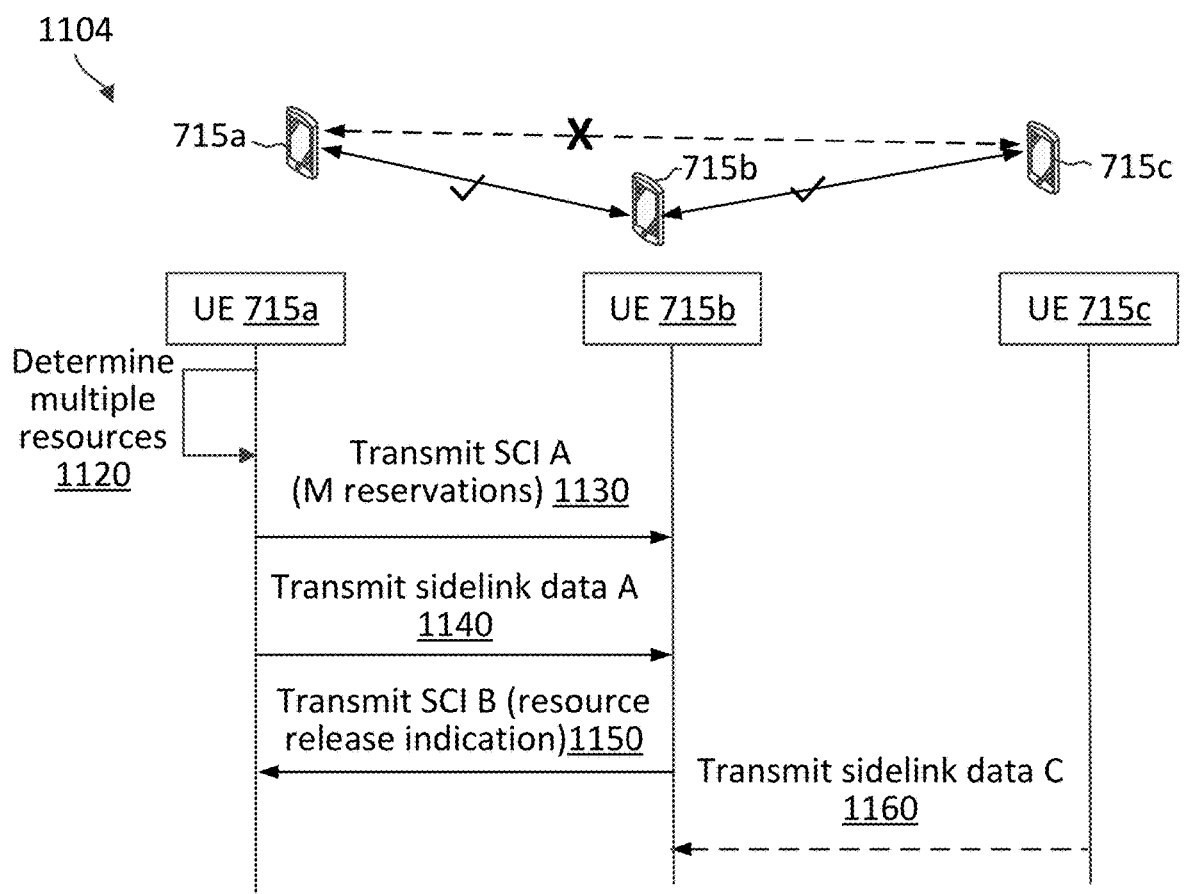
FIG. 11B is a signaling diagram illustrating a sidelink communication method according to some aspects of the present disclosure.

In some aspects, the first wireless communication device may transmit, an indication indicating that there is no sidelink transmission in a second resource of the plurality of resources reserved for the first wireless communication device, for example, as discussed in the scheme 1100 with reference to FIGS. 11A-11B.

Further aspects of the present disclosure include a method of wireless communication. The method of wireless communication includes communicating, by a first wireless communication device with a second wireless communication device, a reservation indicating a plurality of resources for a plurality of sidelink communications. The method of wireless communication also includes communicating, by the first wireless communication device with a third wireless communication device, a first sidelink communication of the plurality of sidelink communications using a first resource of the plurality of resources.

The method may also include one or more of the following features. For instance, the method may include where the reservation indicates the plurality of resources in a plurality of subchannels. The reservation indicates an assignment of the first resource to the first sidelink communication and an assignment of a second resource of the plurality of resources to a second sidelink communication of the plurality of sidelink communications. The communicating the reservation includes transmitting, by the first wireless communication device to the second wireless communication device, sidelink control information (SCI) indicating the reservation. The communicating the reservation includes receiving, by the first wireless communication device from the second wireless communication device, first sidelink control information (SCI) indicating the reservation. The communicating the first sidelink communication includes transmitting, by the first wireless communication device to the third wireless communication device, the first sidelink communication in the first resource. The third wireless communication device corresponds to the second wireless communication device. The third wireless communication device is different than the second wireless communication device. The method may include transmitting, by the first wireless communication device, second SCI indicating at least the first resource indicated by the first SCI. The method may include transmitting, by the first wireless communication device, second SCI repeating the reservation indicated by the first SCI. The communicating the first sidelink communication includes receiving, by the first wireless communication device from the third wireless communication device, the first sidelink communication; and the method further includes transmitting, by the first wireless communication device, second SCI indicating an acknowledgement/negative-acknowledgement ACK/NACK) for the first sidelink communication. The method may include transmitting, by the first wireless communication device, second SCI indicating at least one of a scheduling request (SR) or a buffer status report (BSR) based on the reservation. The method may include transmitting, by the first wireless communication device, an indication indicating that there is no sidelink transmission in a second resource of the plurality of resources reserved for the first wireless communication device. The method may include receiving, by the first wireless communication device, an indication indicating that there is no sidelink transmission in at least a second resource of the plurality of resources; and transmitting, by the first wireless communication device, a repeat of the indication. The method may include detecting, by the first wireless communication device, an indication indicating that there is no sidelink transmission in a reserved resource; and transmitting, by the first wireless communication device, a sidelink communication using the reserved resource in response to the detecting. The method may include detecting, by the first wireless communication device, an indication of a fourth wireless communication device reserving a second resource; and refraining, by the first wireless communication device, from transmitting in the second resource in response to the detecting. The method may include detecting, by the first wireless communication device, an indication of a fourth wireless communication device reserving a second resource; monitoring, by the first wireless communication device, for a transmission in the second resource in response to the detecting; and transmitting, by the first wireless communication device, a sidelink communication using the second resource in response to a determination that no transmission is detected in the second resource from the monitoring.

Further aspects of the present disclosure include an apparatus including a transceiver configured to communicate, with a second wireless communication device, a reservation indicating a plurality of resources for a plurality of sidelink communications; and communicate, with a third wireless communication device, a first sidelink communication of the plurality of sidelink communications using a first resource of the plurality of resources.

The apparatus may also include one or more of the following features. For instance, the apparatus may include where the reservation indicates the plurality of resources in a plurality of subchannels. The reservation indicates an assignment of the first resource to the first sidelink communication and an assignment of a second resource of the plurality of resources to a second sidelink communication of the plurality of sidelink communications. The transceiver configured to communicate the reservation is configured to transmit, to the second wireless communication device, sidelink control information (SCI) indicating the reservation. The transceiver configured to communicate the reservation is configured to receive, from the second wireless communication device, first sidelink control information (SCI) indicating the reservation. The transceiver configured to communicate the first sidelink communication is configured to transmit, to the third wireless communication device, the first sidelink communication in the first resource. The third wireless communication device corresponds to the second wireless communication device. The third wireless communication device is different than the second wireless communication device. The transceiver is further configured to transmit second SCI indicating at least the first resource indicated by the first SCI. The transceiver is further configured to transmit second SCI repeating the reservation indicated by the first SCI. The transceiver configured to communicate the first sidelink communication is configured to receive, from the third wireless communication device, the first sidelink communication; and the transceiver is further configured to transmit second SCI indicating an acknowledgement/negative-acknowledgement ACK/NACK) for the first sidelink communication. The transceiver is further configured to transmit second SCI indicating at least one of a scheduling request (SR) or a buffer status report (BSR) based on the reservation. The transceiver is further configured to transmit an indication indicating that there is no sidelink transmission in a second resource of the plurality of resources reserved for the apparatus. The transceiver is further configured to receive an indication indicating that there is no sidelink transmission in at least a second resource of the plurality of resources; and transmit a repeat of the indication. The transceiver is further configured to transmit a sidelink communication using the reserved resource in response to the detection. The apparatus may include a processor configured to detect an indication of a fourth wireless communication device reserving a second resource; and refrain from transmitting in the second resource in response to the detection. The transceiver is further configured to transmit a sidelink communication using the second resource in response to a determination that no transmission is detected in the second resource from the monitoring.

Further aspects of the present disclosure include a non-transitory computer-readable medium having program code recorded thereon. The non-transitory computer-readable medium includes code for causing a first wireless communication device to communicate, with a second wireless communication device, a reservation indicating a plurality of resources for a plurality of sidelink communications. The non-transitory computer-readable medium also includes code for causing the first wireless communication device to communicate, with a third wireless communication device, a first sidelink communication of the plurality of sidelink communications using a first resource of the plurality of resources.

The non-transitory computer-readable medium may also include one or more of the following features. For instance, the non-transitory computer-readable medium may include where the reservation indicates the plurality of resources in a plurality of subchannels. The reservation indicates an assignment of the first resource to the first sidelink communication and an assignment of a second resource of the plurality of resources to a second sidelink communication of the plurality of sidelink communications. The code for causing the first wireless communication device to communicate the reservation is configured to transmit, to the second wireless communication device, sidelink control information (SCI) indicating the reservation. The code for causing the first wireless communication device to communicate the reservation is configured to receive, from the second wireless communication device, first sidelink control information (SCI) indicating the reservation. The code for causing the first wireless communication device to communicate the first sidelink communication is configured to transmit, to the third wireless communication device, the first sidelink communication in the first resource. The third wireless communication device corresponds to the second wireless communication device. The third wireless communication device is different than the second wireless communication device. The non-transitory computer-readable medium may include code for causing the first wireless communication device to transmit second SCI indicating at least the first resource indicated by the first SCI. The non-transitory computer-readable medium may include code for causing the first wireless communication device to transmit second SCI repeating the reservation indicated by the first SCI. The code for causing the first wireless communication device to communicate the first sidelink communication is configured to receive, from the third wireless communication device, the first sidelink communication; and the program code may include code for causing the first wireless communication device to transmit second SCI indicating an acknowledgement/negative-acknowledgement ACK/NACK) for the first sidelink communication. The non-transitory computer-readable medium may include code for causing the first wireless communication device to transmit second SCI indicating at least one of a scheduling request (SR) or a buffer status report (BSR) based on the reservation. The non-transitory computer-readable medium may include code for causing the first wireless communication device to transmit an indication indicating that there is no sidelink transmission in a second resource of the plurality of resources reserved for the first wireless communication device. The non-transitory computer-readable medium may include code for causing the first wireless communication device to receive an indication indicating that there is no sidelink transmission in at least a second resource of the plurality of resources; and code for causing the first wireless communication device to transmit a repeat of the indication. The non-transitory computer-readable medium may include code for causing the first wireless communication device to detect an indication indicating that there is no sidelink transmission in a reserved resource, code for causing the first wireless communication device to transmit a sidelink communication using the reserved resource in response to the detection. The non-transitory computer-readable medium may include code for causing the first wireless communication device to detect an indication of a fourth wireless communication device reserving a second resource; and code for causing the first wireless communication device to refrain from transmitting in the second resource in response to the detection. The non-transitory computer-readable medium may include code for causing the first wireless communication device to detect an indication of a fourth wireless communication device reserving a second resource; code for causing the first wireless communication device to monitor for a transmission in the second resource in response to the detection; and code for causing the first wireless communication device to transmit a sidelink communication using the second resource in response to a determination that no transmission is detected in the second resource from the monitoring.

Further aspects of the present disclosure include an apparatus including means for communicating, with a second wireless communication device, a reservation indicating a plurality of resources for a plurality of sidelink communications. The apparatus also includes means for communicating, with a third wireless communication device, a first sidelink communication of the plurality of sidelink communications using a first resource of the plurality of resources.

The apparatus may also include one or more of the following features. For instance, the apparatus may include where the reservation indicates the plurality of resources in a plurality of subchannels. The reservation indicates an assignment of the first resource to the first sidelink communication and an assignment of a second resource of the plurality of resources to a second sidelink communication of the plurality of sidelink communications. The means for communicating the reservation is configured to transmit, to the second wireless communication device, sidelink control information (SCI) indicating the reservation. The means for communicating the reservation is configured to receive, from the second wireless communication device, first sidelink control information (SCI) indicating the reservation. The means for communicating the first sidelink communication is configured to transmit, to the third wireless communication device, the first sidelink communication in the first resource. The third wireless communication device corresponds to the second wireless communication device. The third wireless communication device is different than the second wireless communication device. The apparatus may include means for transmitting second SCI indicating at least the first resource indicated by the first SCI. The apparatus may include means for transmitting second SCI repeating the reservation indicated by the first SCI. The means for communicating the first sidelink communication is configured to receive, from the third wireless communication device, the first sidelink communication; and the apparatus may include means for transmitting second SCI indicating an acknowledgement/negative-acknowledgement ACK/NACK) for the first sidelink communication. The apparatus may include means for transmitting second SCI indicating at least one of a scheduling request (SR) or a buffer status report (BSR) based on the reservation. The apparatus may include means for transmitting an indication indicating that there is no sidelink transmission in a second resource of the plurality of resources reserved for the apparatus. The apparatus may include means for receiving an indication indicating that there is no sidelink transmission in at least a second resource of the plurality of resources; and means for transmitting a repeat of the indication. The apparatus may include means for detecting an indication indicating that there is no sidelink transmission in a reserved resource, means for transmitting a sidelink communication using the reserved resource in response to the detection. The apparatus may include means for detecting an indication of a fourth wireless communication device reserving a second resource; and means for refraining from transmitting in the second resource in response to the detection. The apparatus may include means for detecting an indication of a fourth wireless communication device reserving a second resource; means for monitoring for a transmission in the second resource in response to the detection; and means for transmitting a sidelink communication using the second resource in response to a determination that no transmission is detected in the second resource from the monitoring.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:
   receiving, from a second wireless communication device, a first-stage sidelink control information (SCI) comprising a reservation indicating a plurality of reserved physical sidelink shared channel (PSSCH) resources for a plurality of sidelink communications, wherein the reservation in the first stage SCI indicates:
      an assignment of a first PSSCH resource of the plurality of reserved PSSCH resources for a first sidelink transmission from the first wireless communication device to a third wireless communication device, the first PSSCH resource being associated with a first frequency band; and
      an assignment of a second PSSCH resource of the plurality of reserved PSSCH resources for a second sidelink transmission from the first wireless communication device to the second wireless communication device, the second PSSCH resource being associated with a second frequency band different from the first frequency band;
   transmitting, to the third wireless communication device, the first sidelink transmission using the first PSSCH resource of the plurality of reserved PSSCH resources, wherein the first sidelink transmission comprises, in the first PSSCH resource, first sidelink data and a first second-stage SCI associated with the first stage SCI, the first second-stage SCI indicating a first modulation and coding scheme (MCS) associated with the first sidelink data; and
   transmitting, to the second wireless communication device, the second sidelink transmission using the second PSSCH resource of the plurality of reserved PSSCH resources, wherein the second sidelink transmission comprises, in the second PSSCH resource, second sidelink data and a second second-stage SCI associated with the first-stage SCI, the second second-stage SCI indicating a second MCS associated with the second sidelink data.

2. The method of claim 1, wherein the reservation indicates the plurality of reserved PSSCH resources in a plurality of subchannels.

3. The method of claim 1, wherein the plurality of reserved PSSCH resources are identified based on channel sensing.

4. The method of claim 1, wherein
   the method further comprises:
      receiving a SCI indicating an acknowledgement/negative-acknowledgement (ACK/NACK) for the second sidelink transmission.

5. The method of claim 1, further comprising:
   transmitting a SCI indicating at least one of a scheduling request (SR) or a buffer status report (BSR) based on the reservation.

6. The method of claim 1, further comprising:
   transmitting a SCI comprising a second reservation indicating a second plurality of reserved PSSCH resources for a second plurality of sidelink communications; and
   receiving an indication indicating that there is no sidelink transmission in a third PSSCH resource of the second plurality of reserved PSSCH resources, the third PSSCH resource reserved for the first wireless communication device.

7. The method of claim 1, further comprising:
   receiving, from the second wireless communication device, a SCI comprising a second reservation indicating a second plurality of reserved PSSCH resources for a second plurality of sidelink communications; and
   transmitting, to the second wireless communication device, an indication indicating that there is no sidelink transmission in at least a third PSSCH resource of the second plurality of reserved PSSCH resources; and
   receiving a repeat of the indication.

8. The method of claim 1, further comprising:
   transmitting a sidelink communication using the reserved PSSCH resource based on a detection that there is no sidelink transmission in a reserved PSSCH resource.

9. The method of claim 1, further comprising:
   detecting, by the first wireless communication device, an indication of a fourth wireless communication device reserving a third PSSCH resource; and
   refraining, by the first wireless communication device, from transmitting in the third PSSCH resource in response to the detecting.

10. The method of claim 1, further comprising:
    detecting an indication from a fourth wireless communication device reserving a third PSSCH resource;
    monitoring for a transmission in the second PSSCH resource in response to the detecting; and
    transmitting, by the first wireless communication device, a sidelink communication using the third PSSCH resource in response to a determination that no transmission is detected in the third PSSCH resource from the monitoring.

11. The method of claim 1, wherein:
    the reservation in the first stage SCI further indicates an assignment of a third PSSCH resource of the plurality of reserved PSSCH resources for a third sidelink transmission from the second wireless communication device to the first wireless communication device, the third PSSCH resource being associated with a third frequency band different from the first frequency band and the second frequency band; and
    the method further comprises:
       receiving, from the second wireless communication device, the third sidelink transmission using the third PSSCH resource of the plurality of reserved PSSCH resources.

12. An apparatus comprising:
    a memory;
    a transceiver; and
    at least one processor coupled to the memory and the transceiver, wherein the apparatus is configured to:
       receive, from a second wireless communication device, a first-stage sidelink control information (SCI) comprising a reservation indicating a plurality of reserved physical sidelink shared channel (PSSCH) resources for a plurality of sidelink communications, wherein the reservation in the first stage SCI indicates:
          an assignment of a first PSSCH resource of the plurality of reserved PSSCH resources for a first sidelink transmission from the apparatus to a third wireless communication device, the first PSSCH resource being associated with a first frequency band; and an assignment of a second PSSCH resource of the plurality of reserved PSSCH resources for a second sidelink transmission from the apparatus to the second wireless communication device, the second PSSCH resource being associated with a second frequency band different from the first frequency band;

transmit, to the third wireless communication device, the first sidelink transmission using the first PSSCH resource of the plurality of reserved PSSCH resources, wherein the first sidelink transmission comprises, in the first PSSCH resource, first sidelink data and a first second-stage SCI associated with the first stage SCI, the first second-stage SCI indicating a first modulation and coding scheme (MCS) associated with the first sidelink data; and transmit, to the second wireless communication device, the second sidelink transmission using the second PSSCH resource of the plurality of reserved PSSCH resources, wherein the second sidelink transmission comprises, in the second PSSCH resource, second sidelink data and a second second-stage SCI associated with the first stage SCI, the second second-stage SCI indicating a MCS associated with the second sidelink data.

13. The apparatus of claim 12, wherein the reservation indicates the plurality of reserved PSSCH resources in a plurality of subchannels.

14. The apparatus of claim 12, the plurality of reserved PSSCH resources are identified based on channel sensing.

15. The apparatus of claim 12, wherein the transceiver is further configured to:
transmit a SCI comprising a second reservation indicating a second plurality of reserved PSSCH resources for a second plurality of sidelink communications; and
receive an indication indicating that there is no sidelink transmission in a third PSSCH resource of the second plurality of reserved PSSCH resources, the third PSSCH resource reserved for the apparatus.

16. The apparatus of claim 12, wherein the transceiver is further configured to:
receive, from the second wireless communication device, a SCI comprising a second reservation indicating a second plurality of reserved PSSCH resources for a second plurality of sidelink communications; and
transmit an indication indicating that there is no sidelink transmission in at least a third PSSCH resource of the second plurality of reserved PSSCH resources; and
receive a repeat of the indication.

17. The apparatus of claim 12, wherein the transceiver is further configured to:
transmit a sidelink communication using the reserved PSSCH resource based on a detection that there is no sidelink transmission in a reserved PSSCH resource.

18. The apparatus of claim 12, further comprising:
a processor configured to:
detect an indication of a fourth wireless communication device reserving a third PSSCH resource; and
refrain from transmitting in the third PSSCH resource in response to the detection.

19. The apparatus of claim 12, further comprising:
a processor configured to:
detect an indication from a fourth wireless communication device reserving a third PSSCH resource; and
monitor for a transmission in the second PSSCH resource in response to the detection, wherein the transceiver is further configured to:
transmit a sidelink communication using the third PSSCH resource in response to a determination that no transmission is detected in the third PSSCH resource from the monitoring.

20. The apparatus of claim 12, wherein:
the reservation in the first stage SCI further indicates an assignment of a third PSSCH resource of the plurality of reserved PSSCH resources for a third sidelink transmission from the second wireless communication device to the apparatus, the third PSSCH resource being associated with a third frequency band different from the first frequency band and the second frequency band; and
the apparatus is further configured to:
receive, from the second wireless communication device, the third sidelink transmission using the third PSSCH resource of the plurality of reserved PSSCH resources.

21. A non-transitory computer-readable medium having program code recorded thereon, the program code comprising:
code for causing a first wireless communication device to transmit, to a second wireless communication device, a first-stage sidelink control information (SCI) comprising a reservation indicating a plurality of reserved physical sidelink shared channel (PSSCH) resources for a plurality of sidelink communications, wherein the reservation in the first stage SCI indicates:
an assignment of a first PSSCH resource of the plurality of reserved PSSCH resources for a first sidelink transmission from the first wireless communication device to a third wireless communication device, the first PSSCH resource being associated with a first frequency band; and
an assignment of a second PSSCH resource of the plurality of reserved PSSCH resources for a second sidelink transmission from the first wireless communication device to the second wireless communication device, the second PSSCH resource being associated with a second frequency band different from the first frequency band;
code for causing the first wireless communication device to transmit, to the third wireless communication device, the first sidelink transmission using the first PSSCH resource of the plurality of reserved PSSCH resources, wherein the first sidelink transmission comprises, in the first PSSCH resource, first sidelink data and a first second-stage SCI associated with the first stage SCI, the first second-stage SCI indicating a first modulation and coding scheme (MCS) associated with the first sidelink data; and
code for causing the first wireless communication device to transmit, to the second wireless communication device, the second sidelink transmission using the second PSSCH resource of the plurality of reserved PSSCH resources, wherein the second sidelink transmission comprises, in the second PSSCH resource, second sidelink data and a second second-stage SCI associated with the first-stage SCI, the second second-stage SCI indicating a second MCS associated with the second sidelink data.

22. The non-transitory computer-readable medium of claim 21, wherein the plurality of reserved PSSCH resources are identified based on channel sensing.

23. The non-transitory computer-readable medium of claim 21, wherein:

the reservation in the first stage SCI further indicates an assignment of a third PSSCH resource of the plurality of reserved PSSCH resources for a third sidelink transmission from the second wireless communication device to the first wireless communication device; and the program code further comprises:
 code for causing the first wireless communication device to receive, from the second wireless communication device, the third sidelink transmission using the third PSSCH resource of the plurality of reserved PSSCH resources.

* * * * *